(12) United States Patent
Gally et al.

(10) Patent No.: US 8,300,304 B2
(45) Date of Patent: Oct. 30, 2012

(54) INTEGRATED FRONT LIGHT DIFFUSER FOR REFLECTIVE DISPLAYS

(75) Inventors: Brian J. Gally, Los Gatos, CA (US); Gang Xu, Cupertino, CA (US); Ion Bita, San Jose, CA (US); Marek Mienko, San Jose, CA (US); Russell Gruhlke, Milpitas, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 343 days.

(21) Appl. No.: 12/369,690

(22) Filed: Feb. 11, 2009

(65) Prior Publication Data

US 2009/0201571 A1    Aug. 13, 2009

Related U.S. Application Data

(60) Provisional application No. 61/028,116, filed on Feb. 12, 2008.

(51) Int. Cl.
*G02F 1/29* (2006.01)
(52) U.S. Cl. .......................................... 359/315
(58) Field of Classification Search .............. 359/315, 359/291, 296, 599, 443–461; 362/619; 349/193
See application file for complete search history.

(56) References Cited

U.S. PATENT DOCUMENTS

| | | |
|---|---|---|
| 2,518,647 A | 8/1950 | Teeple et al. |
| 3,813,265 A | 5/1974 | Marks |
| 4,378,567 A | 3/1983 | Mir |
| 4,832,459 A | 5/1989 | Harper |
| 4,961,617 A | 10/1990 | Shahidi |
| 4,974,942 A | 12/1990 | Gross |
| 5,038,224 A * | 8/1991 | Martulli et al. ............... 358/446 |
| 5,110,370 A | 5/1992 | Vogeli et al. |
| 5,226,099 A | 7/1993 | Mignardi et al. |
| 5,261,970 A | 11/1993 | Landis et al. |
| 5,289,300 A | 2/1994 | Yamazaki |
| 5,339,179 A | 8/1994 | Rudisill |
| 5,481,385 A | 1/1996 | Zimmerman et al. |
| 5,515,184 A | 5/1996 | Caulfield |
| 5,638,084 A | 6/1997 | Kalt |
| 5,647,036 A | 7/1997 | Deacon |
| 5,671,314 A | 9/1997 | Gregory et al. |
| 5,771,124 A | 6/1998 | Kintz |

(Continued)

FOREIGN PATENT DOCUMENTS

CA    2 490 975    1/2004

(Continued)

OTHER PUBLICATIONS

Invitation to Pay Additional Fees for International Application No. PCT/US2009/033701, Dated Jun. 4, 2009.

(Continued)

*Primary Examiner* — Scott J Sugarman
*Assistant Examiner* — Vipin Patel
(74) *Attorney, Agent, or Firm* — Knobbe, Martens, Olson & Bear, LLP

(57) ABSTRACT

A reflective electronic display includes a front light assembly with a diffuser for enlarging the viewing cone of the display. The front light may include a substrate, a plurality of optical turning features, and a diffuser formed therebetween. The haze of the diffuser may be spatially non-uniform and switchable between two or more levels.

58 Claims, 11 Drawing Sheets

U.S. PATENT DOCUMENTS

| | | | |
|---|---|---|---|
| 5,771,321 A | 6/1998 | Stern | |
| 5,783,614 A | 7/1998 | Chen | |
| 5,805,117 A | 9/1998 | Mazurek | |
| 5,816,677 A * | 10/1998 | Kurematsu et al. | 362/609 |
| 5,892,598 A | 4/1999 | Asakawa et al. | |
| 5,914,804 A | 6/1999 | Goossen | |
| 5,933,183 A | 8/1999 | Enomoto | |
| 5,991,073 A | 11/1999 | Woodgate et al. | |
| 5,999,239 A | 12/1999 | Larson | |
| 6,002,829 A | 12/1999 | Winston | |
| 6,008,449 A | 12/1999 | Cole | |
| 6,014,192 A | 1/2000 | Lehureau | |
| 6,040,937 A | 3/2000 | Miles | |
| 6,049,317 A | 4/2000 | Thompson et al. | |
| 6,074,069 A | 6/2000 | Chao-Ching | |
| 6,091,469 A | 7/2000 | Naito | |
| 6,099,134 A | 8/2000 | Taniguchi | |
| 6,195,196 B1 | 2/2001 | Kimura | |
| 6,211,976 B1 | 4/2001 | Popovich | |
| 6,282,010 B1 | 8/2001 | Sulzbach | |
| 6,323,415 B1 | 11/2001 | Uematsu et al. | |
| 6,356,378 B1 | 3/2002 | Huibers | |
| 6,381,022 B1 | 4/2002 | Zavracky | |
| 6,454,452 B1 | 9/2002 | Sasagawa | |
| 6,483,613 B1 | 11/2002 | Woodgate et al. | |
| 6,522,794 B1 | 2/2003 | Bischel | |
| 6,538,813 B1 | 3/2003 | Magno | |
| 6,574,033 B1 | 6/2003 | Chui | |
| 6,577,429 B1 | 6/2003 | Kurtz | |
| 6,582,095 B1 | 6/2003 | Toyoda | |
| 6,592,234 B2 | 7/2003 | Epstein | |
| 6,603,520 B2 | 8/2003 | Umemoto | |
| 6,631,998 B2 | 10/2003 | Egawa et al. | |
| 6,636,322 B1 | 10/2003 | Terashita | |
| 6,636,358 B2 | 10/2003 | Umemoto et al. | |
| 6,642,913 B1 | 11/2003 | Kimura | |
| 6,643,067 B2 | 11/2003 | Miyamae | |
| 6,650,455 B2 | 11/2003 | Miles | |
| 6,652,109 B2 | 11/2003 | Nakamura | |
| 6,669,350 B2 | 12/2003 | Yamashita | |
| 6,674,562 B1 | 1/2004 | Miles | |
| 6,693,690 B2 | 2/2004 | Umemoto | |
| 6,709,123 B2 | 3/2004 | Flohr | |
| 6,738,194 B1 | 5/2004 | Ramirez | |
| 6,742,921 B2 | 6/2004 | Umemoto et al. | |
| 6,751,023 B2 | 6/2004 | Umemoto et al. | |
| 6,760,135 B1 | 7/2004 | Payne | |
| 6,761,461 B2 | 7/2004 | Mizutani et al. | |
| 6,773,126 B1 | 8/2004 | Hatjasalo | |
| 6,774,962 B2 | 8/2004 | Yoon | |
| 6,794,119 B2 | 9/2004 | Miles | |
| 6,798,469 B2 | 9/2004 | Kimura | |
| 6,819,380 B2 | 11/2004 | Wen et al. | |
| 6,822,745 B2 | 11/2004 | De Groot et al. | |
| 6,841,787 B2 | 1/2005 | Almogy | |
| 6,852,396 B1 | 2/2005 | Mineo | |
| 6,862,141 B2 | 3/2005 | Olczak | |
| 6,866,393 B2 * | 3/2005 | Yano et al. | 362/600 |
| 6,879,354 B1 | 4/2005 | Sawayama | |
| 6,885,377 B2 | 4/2005 | Lim | |
| 6,917,469 B2 | 7/2005 | Momose | |
| 6,930,816 B2 | 8/2005 | Mochizuki | |
| 6,964,484 B2 | 11/2005 | Gupta | |
| 6,967,779 B2 | 11/2005 | Fadel et al. | |
| 6,970,031 B1 | 11/2005 | Martin | |
| 7,002,726 B2 | 2/2006 | Patel | |
| 7,009,754 B2 | 3/2006 | Huibers | |
| 7,012,659 B2 | 3/2006 | Smith et al. | |
| 7,019,734 B2 | 3/2006 | Cross et al. | |
| 7,038,752 B2 | 5/2006 | Lin | |
| 7,041,344 B2 * | 5/2006 | Kusume et al. | 428/1.1 |
| 7,042,643 B2 | 5/2006 | Miles | |
| 7,046,409 B2 | 5/2006 | Kihara | |
| 7,064,875 B2 | 6/2006 | Kawano | |
| 7,072,093 B2 | 7/2006 | Piehl | |
| 7,072,096 B2 | 7/2006 | Holman et al. | |
| 7,099,058 B2 | 8/2006 | Takemori et al. | |
| 7,110,158 B2 | 9/2006 | Miles | |
| 7,113,339 B2 | 9/2006 | Taguchi et al. | |
| 7,123,216 B1 | 10/2006 | Miles | |
| 7,138,984 B1 | 11/2006 | Miles | |
| 7,142,347 B2 | 11/2006 | Islam | |
| 7,156,546 B2 | 1/2007 | Higashiyama | |
| 7,161,730 B2 | 1/2007 | Floyd | |
| 7,218,429 B2 | 5/2007 | Batchko | |
| 7,264,389 B2 * | 9/2007 | Sado et al. | 362/628 |
| 7,324,248 B2 | 1/2008 | Brotherton-Ratcliffe et al. | |
| 7,327,510 B2 | 2/2008 | Cummings et al. | |
| 7,336,329 B2 | 2/2008 | Yoon | |
| 7,342,705 B2 | 3/2008 | Chui et al. | |
| 7,342,709 B2 | 3/2008 | Lin | |
| 7,352,501 B2 | 4/2008 | Chopra et al. | |
| 7,359,011 B2 | 4/2008 | Hamada | |
| 7,360,899 B2 | 4/2008 | McGuire | |
| 7,366,393 B2 | 4/2008 | Cassarly | |
| 7,369,292 B2 | 5/2008 | Xu et al. | |
| 7,369,294 B2 | 5/2008 | Gally | |
| 7,403,180 B1 | 7/2008 | Silverstein et al. | |
| 7,417,735 B2 | 8/2008 | Cummings | |
| 7,417,784 B2 | 8/2008 | Sasagawa | |
| 7,450,295 B2 | 11/2008 | Tung | |
| 7,456,805 B2 | 11/2008 | Ouderkirk | |
| 7,498,621 B2 | 3/2009 | Seitz | |
| 7,502,168 B2 | 3/2009 | Akutsu et al. | |
| 7,508,571 B2 | 3/2009 | Gally et al. | |
| 7,561,323 B2 | 7/2009 | Gally et al. | |
| 7,564,612 B2 | 7/2009 | Chui | |
| 7,603,001 B2 | 10/2009 | Wang | |
| 7,630,123 B2 | 12/2009 | Kothari | |
| 7,643,203 B2 | 1/2010 | Gousev et al. | |
| 7,663,714 B2 | 2/2010 | Haga et al. | |
| 7,688,494 B2 | 3/2010 | Xu et al. | |
| 7,706,050 B2 | 4/2010 | Sampsell | |
| 7,710,636 B2 | 5/2010 | Chui | |
| 7,733,439 B2 | 6/2010 | Sampsell | |
| 7,750,886 B2 | 7/2010 | Sampsell | |
| 7,777,954 B2 | 8/2010 | Gruhike et al. | |
| 7,813,029 B2 | 10/2010 | Kothari et al. | |
| 7,855,827 B2 | 12/2010 | Xu et al. | |
| 7,859,731 B2 | 12/2010 | Choi | |
| 7,864,395 B2 | 1/2011 | Chui | |
| 7,880,954 B2 | 2/2011 | Sampsell | |
| 2001/0019479 A1 | 9/2001 | Nakabayashi | |
| 2001/0026001 A1 | 10/2001 | Yagi | |
| 2001/0049061 A1 | 12/2001 | Nakagaki | |
| 2002/0006036 A1 | 1/2002 | Egawa | |
| 2002/0054258 A1 | 5/2002 | Kondo | |
| 2002/0075245 A1 | 6/2002 | Kawashima | |
| 2002/0075555 A1 | 6/2002 | Miles | |
| 2002/0080465 A1 | 6/2002 | Han | |
| 2002/0106182 A1 | 8/2002 | Kawashima | |
| 2002/0149584 A1 | 10/2002 | Simpson | |
| 2002/0154256 A1 | 10/2002 | Gotoh | |
| 2003/0016930 A1 | 1/2003 | Inditsky | |
| 2003/0083429 A1 | 5/2003 | Smith | |
| 2003/0095401 A1 | 5/2003 | Hanson | |
| 2003/0151821 A1 | 8/2003 | Favalora | |
| 2003/0160919 A1 | 8/2003 | Suzuki | |
| 2003/0161040 A1 | 8/2003 | Ishii | |
| 2003/0169385 A1 | 9/2003 | Okuwaki | |
| 2003/0184690 A1 | 10/2003 | Ogiwara | |
| 2003/0193630 A1 | 10/2003 | Chiou | |
| 2003/0210222 A1 | 11/2003 | Ogiwara et al. | |
| 2003/0210363 A1 | 11/2003 | Yasukawa | |
| 2003/0214728 A1 | 11/2003 | Olczak | |
| 2003/0222857 A1 | 12/2003 | Abileah | |
| 2004/0027315 A1 | 2/2004 | Senda et al. | |
| 2004/0027339 A1 | 2/2004 | Schulz | |
| 2004/0032401 A1 | 2/2004 | Nakazawa | |
| 2004/0070711 A1 | 4/2004 | Wen | |
| 2004/0080938 A1 | 4/2004 | Holman | |
| 2004/0085748 A1 | 5/2004 | Sugiura | |
| 2004/0188150 A1 | 9/2004 | Richard et al. | |
| 2004/0188599 A1 | 9/2004 | Viktorovitch | |
| 2004/0233357 A1 | 11/2004 | Fujimori | |
| 2004/0246743 A1 | 12/2004 | Lee | |
| 2005/0010568 A1 | 1/2005 | Nagatomo | |

| | | | |
|---|---|---|---|
| 2005/0024849 A1 | 2/2005 | Parker | |
| 2005/0041175 A1 | 2/2005 | Akiyama | |
| 2005/0069254 A1 | 3/2005 | Schultheis | |
| 2005/0120553 A1 | 6/2005 | Brown | |
| 2005/0133761 A1 | 6/2005 | Thielemans | |
| 2005/0141065 A1 | 6/2005 | Masamoto | |
| 2005/0146897 A1 | 7/2005 | Mimura | |
| 2005/0231977 A1 | 10/2005 | Hayakawa | |
| 2005/0259939 A1 | 11/2005 | Rinko | |
| 2005/0286113 A1 | 12/2005 | Miles | |
| 2006/0001942 A1 | 1/2006 | Chui | |
| 2006/0066586 A1 | 3/2006 | Gally | |
| 2006/0066935 A1 | 3/2006 | Cummings | |
| 2006/0067600 A1 | 3/2006 | Gally | |
| 2006/0077124 A1 | 4/2006 | Gally | |
| 2006/0109682 A1 | 5/2006 | Ko et al. | |
| 2006/0126142 A1 | 6/2006 | Choi | |
| 2006/0132383 A1 | 6/2006 | Gally | |
| 2006/0209012 A1 | 9/2006 | Hagood, IV | |
| 2006/0209385 A1 | 9/2006 | Liu | |
| 2006/0215958 A1 | 9/2006 | Yeo | |
| 2006/0227532 A1 | 10/2006 | Ko et al. | |
| 2006/0279558 A1 | 12/2006 | Van Delden et al. | |
| 2006/0291769 A1 | 12/2006 | Spoonhower et al. | |
| 2007/0018585 A1* | 1/2007 | Ijzerman et al. | 315/15 |
| 2007/0036492 A1 | 2/2007 | Lee | |
| 2007/0070270 A1* | 3/2007 | Yu et al. | 349/113 |
| 2007/0125415 A1 | 6/2007 | Sachs | |
| 2007/0229737 A1 | 10/2007 | Takeda | |
| 2007/0253054 A1* | 11/2007 | Miles | 359/290 |
| 2008/0084600 A1 | 4/2008 | Bita et al. | |
| 2008/0112039 A1 | 5/2008 | Chui | |
| 2008/0137175 A1 | 6/2008 | Lin | |
| 2008/0151347 A1 | 6/2008 | Chui | |
| 2008/0192484 A1 | 8/2008 | Lee | |
| 2008/0266333 A1 | 10/2008 | Silverstein et al. | |
| 2009/0059346 A1 | 3/2009 | Xu | |
| 2009/0086466 A1 | 4/2009 | Sugita | |
| 2009/0097100 A1 | 4/2009 | Gally | |
| 2009/0101623 A1 | 4/2009 | Bita et al. | |
| 2009/0103166 A1 | 4/2009 | Khazeni et al. | |
| 2009/0126792 A1 | 5/2009 | Gruhlke | |
| 2009/0147332 A1 | 6/2009 | Bita et al. | |
| 2009/0147535 A1 | 6/2009 | Mienko | |
| 2009/0251752 A1 | 10/2009 | Gruhlke | |
| 2009/0255569 A1 | 10/2009 | Sampsell | |
| 2009/0296194 A1 | 12/2009 | Gally | |
| 2009/0310208 A1 | 12/2009 | Wang | |
| 2009/0323144 A1 | 12/2009 | Gruhlke et al. | |
| 2009/0323153 A1 | 12/2009 | Sampsell | |
| 2010/0026727 A1 | 2/2010 | Bita et al. | |
| 2010/0052880 A1 | 3/2010 | Laitinen et al. | |
| 2010/0103488 A1 | 4/2010 | Gruhlke et al. | |
| 2010/0141557 A1 | 6/2010 | Gruhlke | |
| 2010/0149624 A1 | 6/2010 | Kothari | |
| 2010/0165443 A1 | 7/2010 | Chui | |

FOREIGN PATENT DOCUMENTS

| | | |
|---|---|---|
| CN | 1272922 | 11/2000 |
| CN | 1286424 | 3/2001 |
| CN | 1643439 A | 7/2005 |
| DE | 34 02 746 | 8/1985 |
| DE | 196 22 748 | 12/1997 |
| DE | 199 42 513 | 3/2001 |
| DE | 102 28 946 | 1/2004 |
| EP | 0 278 038 | 8/1988 |
| EP | 0 590 511 | 4/1994 |
| EP | 0 822 441 | 2/1998 |
| EP | 0 879 991 | 11/1998 |
| EP | 0 957 392 | 11/1999 |
| EP | 1 081 633 | 3/2001 |
| EP | 1 122 586 A2 | 8/2001 |
| EP | 1 143 270 | 10/2001 |
| EP | 1 199 512 | 4/2002 |
| EP | 1 251 454 | 10/2002 |
| EP | 1 271 223 | 1/2003 |
| EP | 1 279 892 A1 | 1/2003 |
| EP | 1 296 094 | 3/2003 |
| EP | 1 329 664 A1 | 7/2003 |
| EP | 1 336 876 | 8/2003 |
| EP | 1 347 315 | 9/2003 |
| EP | 1 389 775 | 2/2004 |
| EP | 1 437 610 | 7/2004 |
| EP | 1 519 218 | 3/2005 |
| EP | 1 531 302 | 5/2005 |
| EP | 1 577 701 | 9/2005 |
| EP | 1 734 401 | 12/2006 |
| GB | 2 260 203 | 4/1993 |
| GB | 2 278 222 | 11/1994 |
| GB | 2 315 356 | 1/1998 |
| JP | 62 009317 | 1/1987 |
| JP | 04 081816 | 3/1992 |
| JP | 05 281479 | 10/1993 |
| JP | 07-509327 | 10/1995 |
| JP | 09 022012 | 1/1997 |
| JP | 09-507920 | 8/1997 |
| JP | 09 307140 | 11/1997 |
| JP | 11 160687 | 6/1999 |
| JP | 11 174234 | 7/1999 |
| JP | 11 211999 | 8/1999 |
| JP | 2000 514568 | 10/2000 |
| JP | 2000 305074 | 11/2000 |
| JP | 2001-297615 * | 10/2001 |
| JP | 2001 305312 | 10/2001 |
| JP | 2001 343514 | 12/2001 |
| JP | 2002 174780 | 6/2002 |
| JP | 2002-297044 | 10/2002 |
| JP | 2003 066451 | 3/2003 |
| JP | 2003 173713 | 6/2003 |
| JP | 2003 188959 | 7/2003 |
| JP | 2004-012918 | 1/2004 |
| JP | 2004-062099 | 2/2004 |
| JP | 2004-510185 | 4/2004 |
| JP | 2004-206049 | 7/2004 |
| WO | WO 94/06871 A1 | 3/1994 |
| WO | WO 95/01584 | 1/1995 |
| WO | WO 95/14256 | 5/1995 |
| WO | WO 95/15582 A1 | 6/1995 |
| WO | WO 97/01240 | 1/1997 |
| WO | WO 97/17628 | 5/1997 |
| WO | WO 97/46908 | 12/1997 |
| WO | WO 98/19201 | 5/1998 |
| WO | WO 99/63394 | 12/1999 |
| WO | WO 00/50807 | 8/2000 |
| WO | WO 01/57434 | 8/2001 |
| WO | WO 01/81994 | 11/2001 |
| WO | WO 01/84229 | 11/2001 |
| WO | WO 03/032058 | 4/2003 |
| WO | WO 03/056876 | 7/2003 |
| WO | WO 03/062912 | 7/2003 |
| WO | WO 03/075207 | 9/2003 |
| WO | WO 2004/006003 | 1/2004 |
| WO | WO 2004/027514 | 4/2004 |
| WO | WO 2004/036270 | 4/2004 |
| WO | WO 2007/073203 A1 | 6/2007 |
| WO | WO 2007/094558 | 8/2007 |
| WO | WO 2008/045218 | 4/2008 |
| WO | WO 2008/045311 | 4/2008 |
| WO | WO 2008/045364 | 4/2008 |
| WO | WO 2008/045462 | 4/2008 |
| WO | WO 2009/102733 | 8/2009 |
| WO | WO 2010/002701 | 1/2010 |

OTHER PUBLICATIONS

International Search Report and Written Opinion for PCT/US2009/033701, Dated Aug. 10, 2009.

Fan et al. "Channel Drop Filters in Photonic Crystals", Optics Express, vol. 3, No. 1, pp. 4-11, 1998.

Giles et al. "Silicon MEMS Optical Switch Attenuator and Its Use in Lightwave Subsystems", IEEE Journal of Selected Topics in Quantum Electronics, vol. 5. No. 1, pp. 18-25, Jan./Feb. 1999.

Little et al. "Vertically Coupled Microring Rosonator Channel Dropping Filter", IEEE Photonics Technology Letters, vol. 11, No. 2, pp. 215-217, 1999.

Magel, "Integrated Optic Devices Using Micromachined Metal Membranes", SPIE vol. 2686, 0-8194-2060-3, pp. 54-63, 1996.

Mehregany et al., "MEMS applications in Optical Systems," IEEE/LEOS 1996 Summer Topical Meetings, pp. 75-76, Aug. 1996.

Miles, M. et al., "Digital Paper™ for reflective displays," Journal of the Society for Information Display, Society for Information Display, San Jose, US, vol. 11, No. 1, pp. 209-215, 2003.

Oliner, "Radiating Elements and Mutual Coupling," Microwave Scanning Antennas, vol. 2, pp. 131-157 and pp. 190-194, 1966.

Zhou et al. "Waveguide Panel Display Using Electromechanical Spatial Modulators" SID Digest, vol. XXIX, 1998.

International Preliminary Report on Patentability in PCT/US2009/033701 (Publication No. WO 2009/102733) dated Aug. 17, 2010.

* cited by examiner

|  | Column Output Signals | |
|---|---|---|
|  | $+V_{bias}$ | $-V_{bias}$ |
| Row Output Signals  0 | Stable | Stable |
| $+\Delta V$ | Relax | Actuate |
| $-\Delta V$ | Actuate | Relax |

INTEGRATED FRONT LIGHT DIFFUSER FOR REFLECTIVE DISPLAYS

RELATED APPLICATIONS

This application claims priority to U.S. Provisional Patent Application 61/028,116, filed Feb. 12, 2008, and entitled "INTEGRATED FRONT LIGHT DIFFUSER FOR REFLECTIVE DISPLAYS," which is hereby incorporated by reference herein in its entirety.

BACKGROUND

1. Field of the Invention

The present invention relates to microelectromechanical systems (MEMS).

2. Description of Related Technology

Microelectromechanical systems (MEMS) include micro mechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY

In some embodiments, a display device comprises: an optically transmissive substrate; a plurality of display elements rearward of the substrate; a plurality of turning features forward of the substrate; and a diffuser between the plurality of turning features and the substrate, wherein the haze of the diffuser is spatially non-uniform.

In some embodiments, a display device comprises: a plurality of pixels; a light assembly configured to illuminate the plurality of pixels, the light assembly comprising: a light source to output light; a light guide that is configured to distribute light from the light source to the plurality of pixels; and a diffuser that is switchable between a first state wherein the diffuser has a first haze value at a selected point and a second state wherein the diffuser has a second haze value at the selected point, the second haze value being greater than the first; and a controller configured to place the diffuser in the first state when the output of the light source is above a selected threshold, and to place the diffuser in the second state when the output of the light source is below the selected threshold.

In some embodiments, a display device comprises: means for providing structural support to the display device, said support means being optically transmissive; means for displaying an image, said image display means disposed rearward of the support means; means for turning light, said light turning means disposed forward of the support means; and means for diffusing light, said diffusing means disposed between the light turning means and the support means, wherein the haze of the diffusing means is spatially non-uniform.

In some embodiments, a display device comprises: means for displaying an image; means for illuminating the image display means, the illumination means comprising: means for outputting light; means for guiding and distributing light from the light outputting means to the image display means; means for diffusing light, wherein the light diffusing means is switchable between a first state wherein the light diffusing means has a first haze value at a selected point, and a second state wherein the light diffusing means has a second haze value at the selected point, the second haze value being greater than the first; and means for controlling the light diffusing means to be in the first state when the output of the light outputting means is above a selected threshold, and to place the light diffusing means in the second state when the output of the light outputting means is below the selected threshold.

In some embodiments, a method for fabricating a display device comprises: providing an optically transmissive substrate; disposing a plurality of display elements below the substrate; disposing a diffuser above the substrate, wherein the haze of the diffuser is spatially non-uniform; and disposing a plurality of turning features above the diffuser.

In some embodiments, a method for operating a display device comprises: providing a display device comprising, a plurality of pixels, and a light assembly configured to illuminate the plurality of pixels, the light assembly comprising a light source to output light, a light guide that is configured to distribute light from the light source to the plurality of pixels, and a diffuser that is switchable between a first state wherein the diffuser has a first haze value at a selected point and a second state wherein the diffuser has a second haze value at the selected point, the second haze value being greater than the first; and controlling the diffuser to be in the first state when the output of the light source is above a selected threshold, and controlling the diffuser to be in the second state when the output of the light source is below the selected threshold.

DETAILED DESCRIPTION

Figure 1:
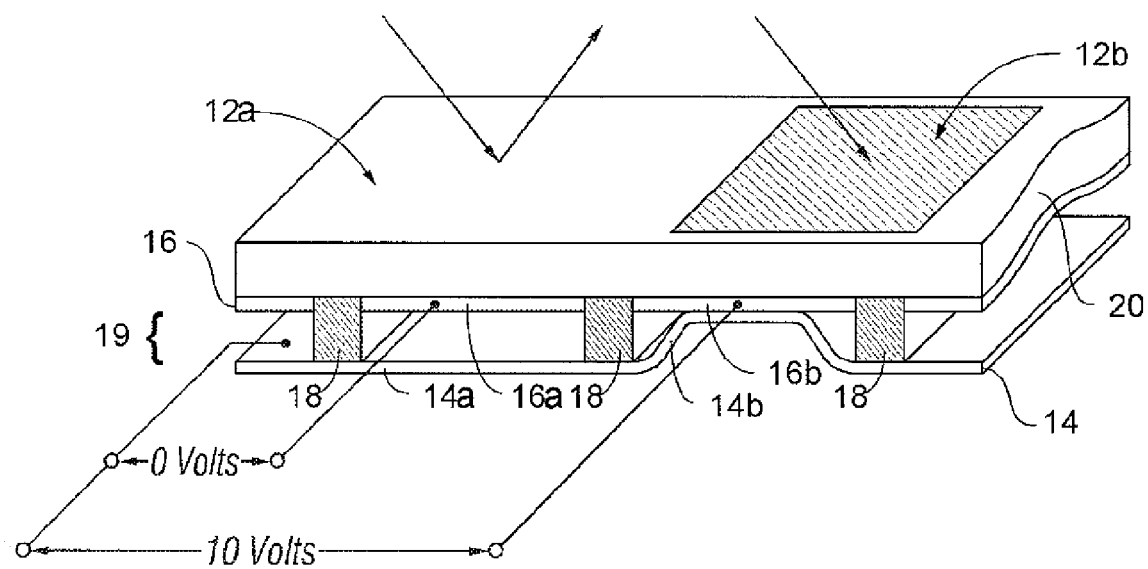
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

The following detailed description is directed to certain specific embodiments. However, the teachings herein can be applied in a multitude of different ways. In this description, reference is made to the drawings wherein like parts are designated with like numerals throughout. The embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

Displays for electronic devices generally include an array of display elements that form pixels which modulate light to form a viewable image. For example, the display elements may be interferometric modulators, as described herein. In the case of reflective displays, light incident upon the display elements is modulated by varying the reflectivity of the display elements. In relatively bright ambient operating conditions, the light that is incident upon the display elements may come from an external source. A reflective display may also include a front light assembly that includes for example, a built-in light source and a light guide for illuminating the display elements when the display is operated dim ambient light conditions.

Images generated by reflective displays are typically more specular in nature than diffusive. As a result, images formed by the display may be viewable under a limited range of viewing angles. However, a diffuser can be included within the reflective display to increase the range of angles over which the display is viewable. While the diffuser is intended to scatter light that is incident upon the display from an external source when the display is operated under bright ambient conditions, it may also undesirably scatter light propagating within the light guide when the display is being operated in dim ambient conditions and the front light assembly is activated. Thus, in dim ambient conditions when the front light is activated, the diffuser may scatter light out of the front light's light guide before the light has reflected from the display elements (e.g., interferometric modulators), thus reducing viewing contrast of the display. Additionally, the scattering of light by the diffuser as it propagates through the light guide away from the built-in light source may cause the light output of the display to be non-uniform. For example, portions of the display that are located further from the built-in light source may appear dimmer than portions of the display nearer the built-in light source. These complications can be remedied by designing the diffuser to have a non-uniform haze across the surface of the display, as described in more detail herein.

One interferometric modulator display embodiment comprising an interferometric MEMS display element is illustrated in FIG. 1. In these devices, the pixels are in either a bright or dark state. In the bright ("relaxed" or "open") state, the display element reflects a large portion of incident visible light to a user. When in the dark ("actuated" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical gap with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise several fused layers, which can include an electrode layer, such as indium tin oxide (ITO), a partially reflective layer, such as chromium, and a transparent dielectric. The optical stack 16 is thus electrically conductive, partially transparent and partially reflective, and may be fabricated, for example, by depositing one or more of the above layers onto a transparent substrate 20. The partially reflective layer can be formed from a variety of materials that are partially reflective such as various metals, semiconductors, and dielectrics. The partially reflective layer can be formed of one or more layers of materials, and each of the layers can be formed of a single material or a combination of materials.

In some embodiments, the layers of the optical stack 16 are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) to form columns deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device. Note that FIG. 1 may not be to scale. In some embodiments, the spacing between posts 18 may be on the order of 10-100 um, while the gap 19 may be on the order of <1000 Angstroms.

With no applied voltage, the gap 19 remains between the movable reflective layer 14a and optical stack 16a, with the movable reflective layer 14a in a mechanically relaxed state, as illustrated by the pixel 12a in FIG. 1. However, when a potential (voltage) difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this FIG.) within the optical stack 16 may prevent shorting and control the separation distance between layers 14 and 16, as illustrated by actuated pixel 12b on the right in FIG. 1. The behavior is the same regardless of the polarity of the applied potential difference.

FIGS. 2 through 5 illustrate one exemplary process and system for using an array of interferometric modulators in a display application.

Figure 2:
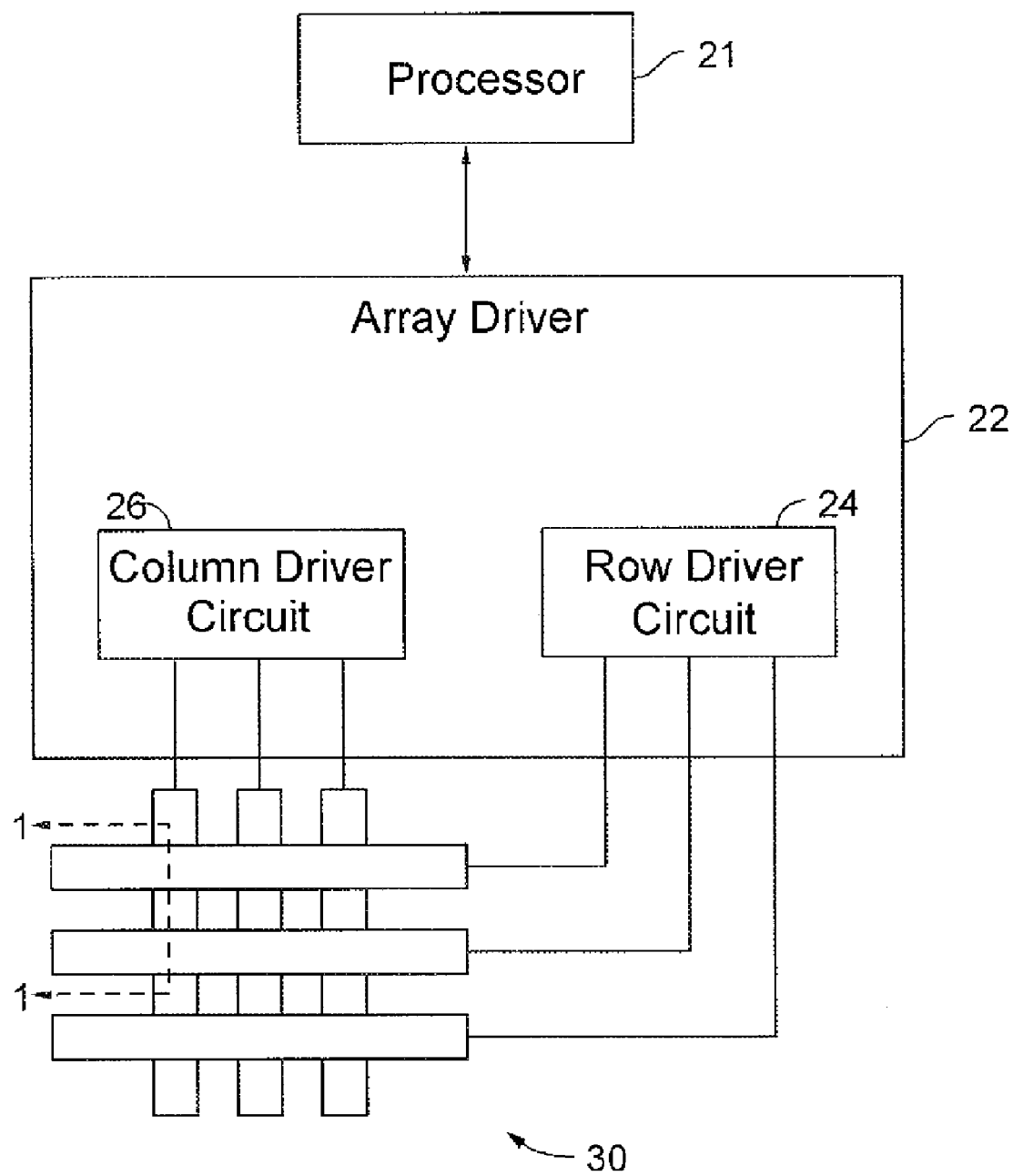
FIG. 2 is a system block diagram illustrating one embodiment of an electronic device incorporating a 3×3 interferometric modulator display.

FIG. 2 is a system block diagram illustrating one embodiment of an electronic device that may incorporate interferometric modulators. The electronic device includes a processor 21 which may be any general purpose single- or multi-chip microprocessor such as an ARM®, Pentium®, 8051, MIPS®, Power PC®, or ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a display array or panel 30. The cross section of the array illustrated in FIG. 1 is shown by the lines 1-1 in FIG. 2. Note that although FIG. 2 illustrates a 3×3 array of interferometric modulators for the sake of clarity, the display array 30 may contain a very large number of interferometric modulators, and may have a different number of interferometric modulators in rows than in columns (e.g., 300 pixels per row by 190 pixels per column).

Figures 3, 4:
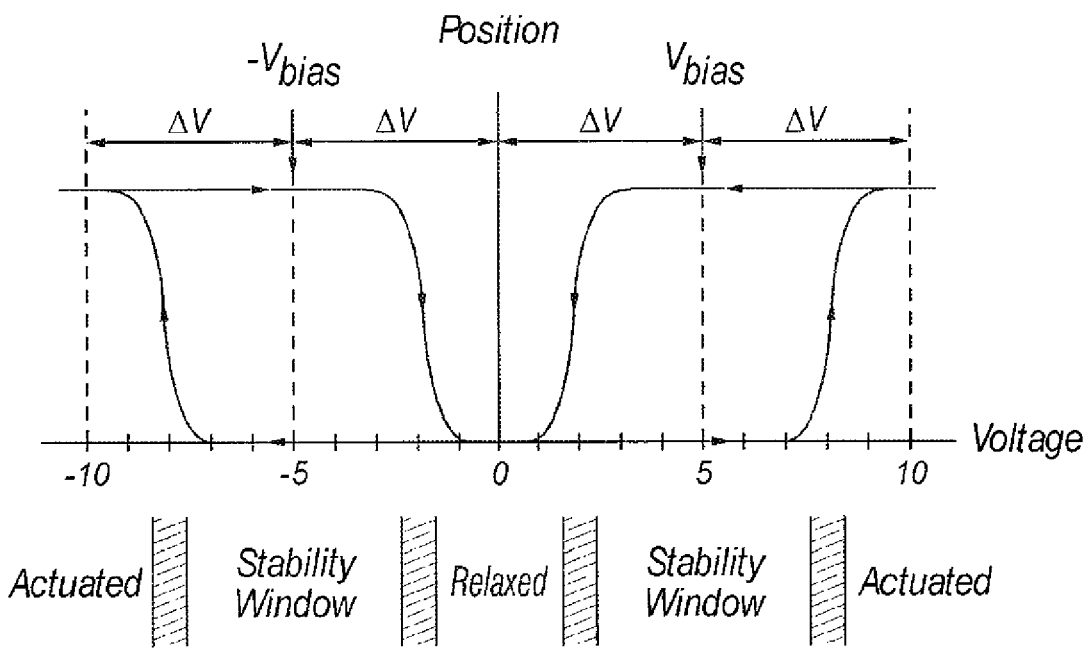
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

FIG. 3 is a diagram of movable mirror position versus applied voltage for one exemplary embodiment of an interferometric modulator of FIG. 1. For MEMS interferometric modulators, the row/column actuation protocol may take advantage of a hysteresis property of these devices as illustrated in FIG. 3. An interferometric modulator may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. There is thus a range of voltage, about 3 to 7 V in the example illustrated in FIG. 3, where there exists a window of applied voltage within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state or bias voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

As described further below, in typical applications, a frame of an image may be created by sending a set of data signals (each having a certain voltage level) across the set of column electrodes in accordance with the desired set of actuated pixels in the first row. A row pulse is then applied to a first row electrode, actuating the pixels corresponding to the set of data signals. The set of data signals is then changed to correspond to the desired set of actuated pixels in a second row. A pulse is then applied to the second row electrode, actuating the appropriate pixels in the second row in accordance with the data signals. The first row of pixels are unaffected by the second row pulse, and remain in the state they were set to during the first row pulse. This may be repeated for the entire series of rows in a sequential fashion to produce the frame. Generally, the frames are refreshed and/or updated with new image data by continually repeating this process at some desired number of frames per second. A wide variety of protocols for driving row and column electrodes of pixel arrays to produce image frames may be used.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts respectively Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

Figure 5A:
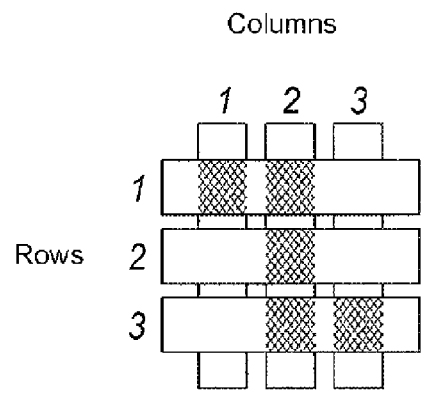
FIGS. 5A and 5B illustrate one exemplary timing diagram for row and column signals that may be used to write a frame of display data to the 3×3 interferometric modulator display of FIG. 2.
Figure 5B:
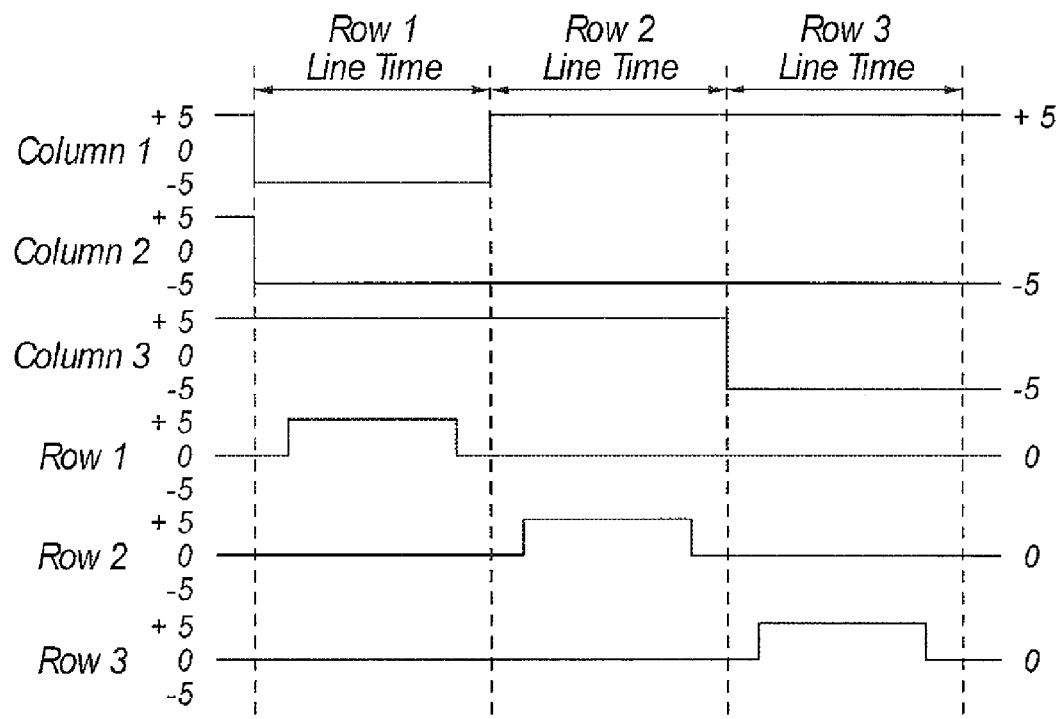

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are initially at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. The same procedure can be employed for arrays of dozens or hundreds of rows and columns. The timing, sequence, and levels of voltages used to perform row and column actuation can be varied widely within the general principles outlined above, and the above example is exemplary only, and any actuation voltage method can be used with the systems and methods described herein.

Figure 6A:
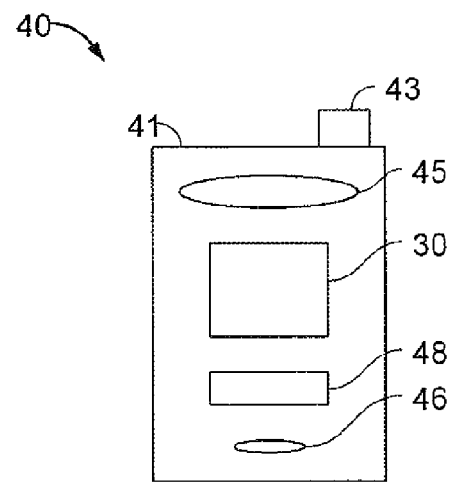
FIGS. 6A and 6B are system block diagrams illustrating an embodiment of a visual display device comprising a plurality of interferometric modulators.
Figure 6B:
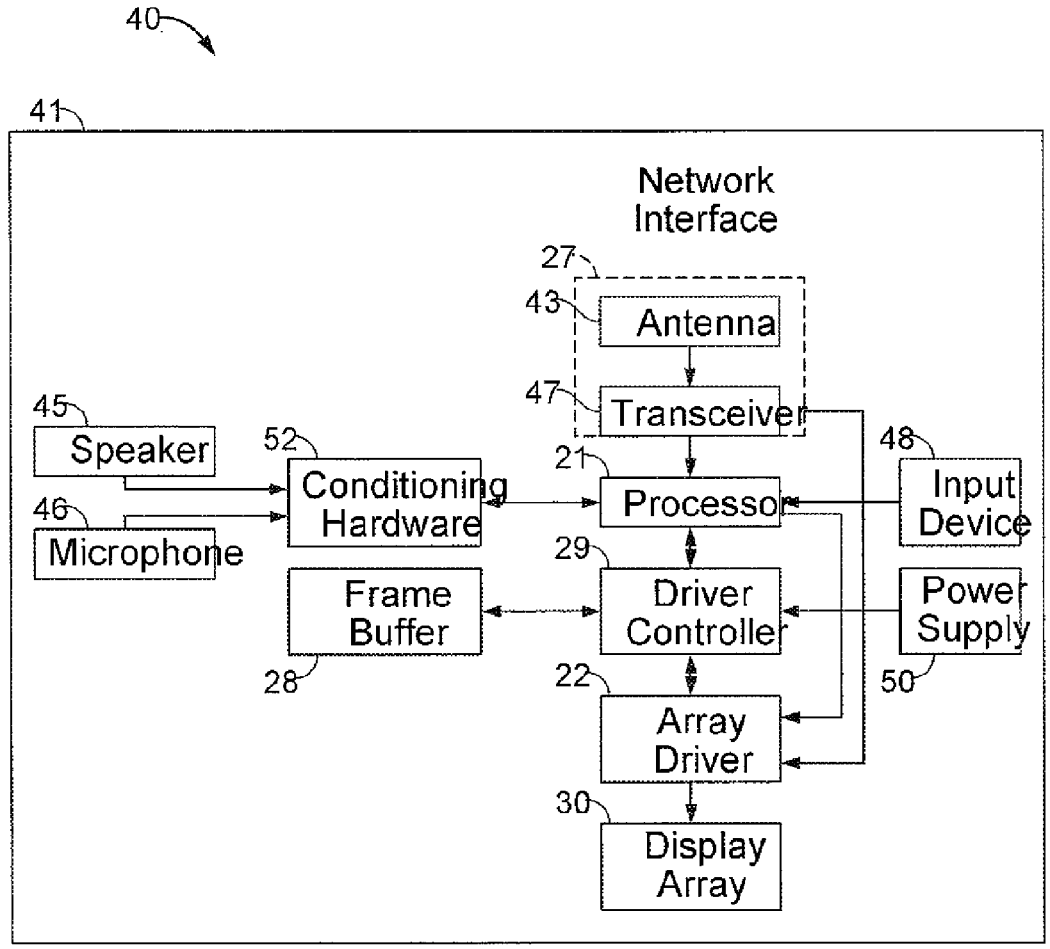

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 45, an input device 48, and a microphone 46. The housing 41 is generally formed from any of a variety of manufacturing processes, including injection molding, and vacuum forming. In addition, the housing 41 may be made from any of a variety of materials, including but not limited to plastic, metal, glass, rubber, and ceramic, or a combination thereof. In one embodiment the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g. filter a signal). The conditioning hardware 52 is connected to a speaker 45 and a microphone 46. The processor 21 is also connected to an input device 48 and a driver controller 29. The driver controller 29 is coupled to a frame buffer 28, and to an array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one ore more devices over a network. In one embodiment the network interface 27 may also have some processing capabilities to relieve requirements of the processor 21. The antenna 43 is any antenna for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS, W-CDMA, or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell, including a plastic solar cell, and solar-cell paint. In another embodiment, power supply 50 is configured to receive power from a wall outlet.

In some implementations control programmability resides, as described above, in a driver controller which can be located in several places in the electronic display system. In some cases control programmability resides in the array driver 22. The above-described optimization may be implemented in any number of hardware and/or software components and in various configurations.

Figure 7A:
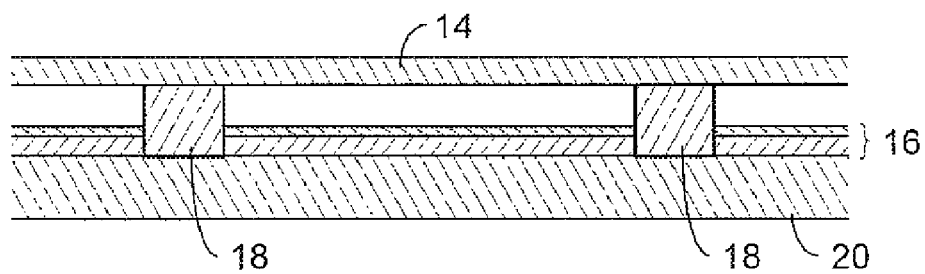
FIG. 7A is a cross section of the device of FIG. 1.
Figure 7B:
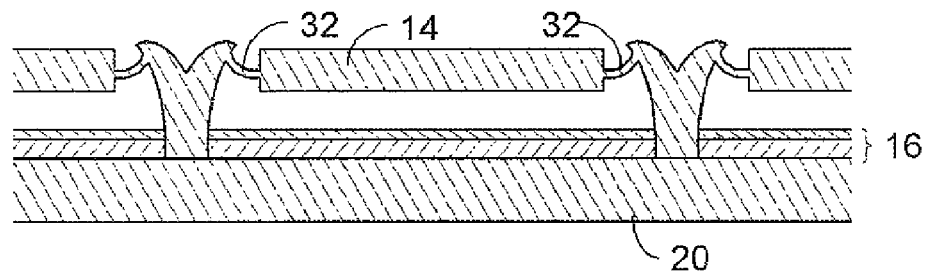
FIG. 7B is a cross section of an alternative embodiment of an interferometric modulator.
Figure 7C:
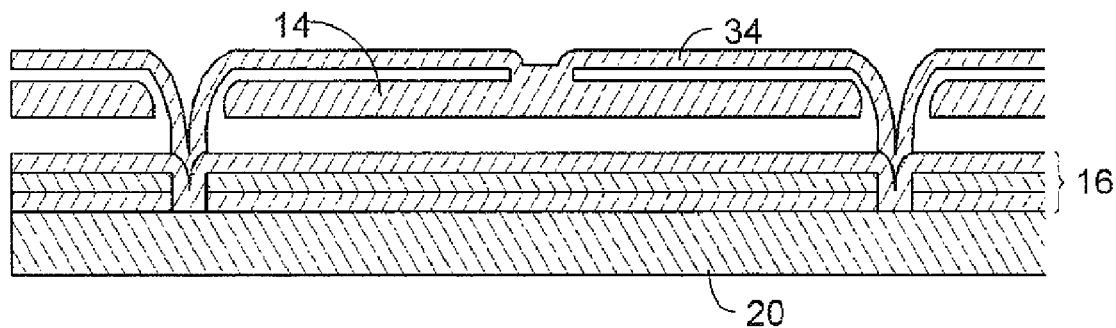
FIG. 7C is a cross section of another alternative embodiment of an interferometric modulator.
Figure 7D:
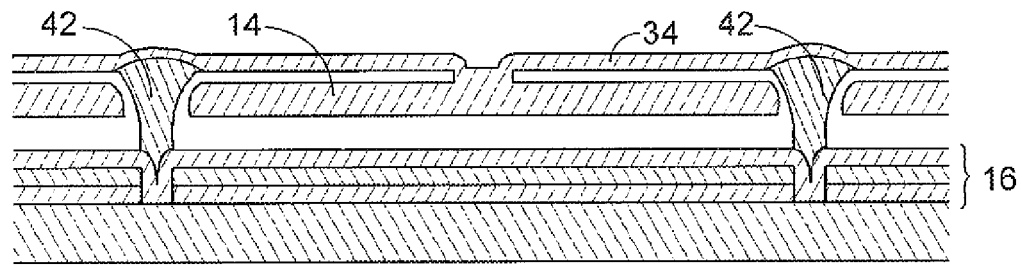
FIG. 7D is a cross section of yet another alternative embodiment of an interferometric modulator.
Figure 7E:
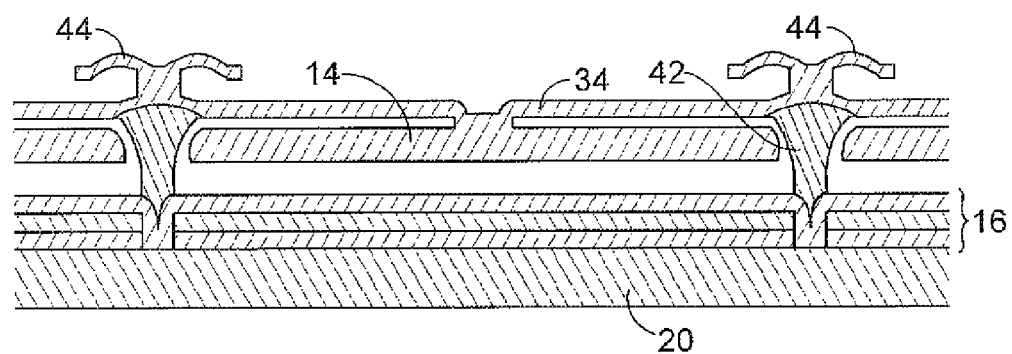
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the moveable reflective layer 14 of each interferometric modulator is square or rectangular in shape and attached to supports at the corners only, on tethers 32. In FIG. 7C, the moveable reflective layer 14 is square or rectangular in shape and suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the gap, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields the portions of the interferometric modulator on the side of the reflective layer opposite the substrate 20, including the deformable layer 34. This allows the shielded areas to be configured and operated upon without negatively affecting the image quality. For example, such shielding allows the bus structure 44 in FIG. 7E, which provides the ability to separate the optical properties of the modulator from the electromechanical properties of the modulator, such as addressing and the movements that result from that addressing. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

As described above, interferometric modulators can be used in reflective display technologies. A reflective display generally relies on a source of light incident upon reflective display elements (e.g., interferometric modulators, as described herein) to produce a viewable image. This light may come from an external source, such as the ambient lighting conditions where the display is being used. Alternatively, a built-in source of illumination may also be provided for illumination of the reflective display in dark ambient environments. The built-in illumination source for reflective displays may, for example, be a front light assembly that uses a light guide to collect light through an input port and redirect it towards reflective display elements that are modulated to form an image.

One drawback of certain reflective displays is that they are undesirably specular in nature. As a result, the displays are satisfactorily viewable only over a relatively small range of viewing angles (i.e., the viewing cone). One solution to enlarge the viewing cone of a reflective display is to incorporate a diffuser within the display at some location along the optical path of light reflected by the display. For example, a diffuser could be situated on the viewer side of a light guide used in a front light assembly for the reflective display. However, this placement of the diffuser may detrimentally affect the optical performance of the reflective display by decreasing the displayable resolution and contrast. Alternatively, the diffuser may be situated on the opposite side of the light guide, for example, between the light guide and an array of interferometric modulator display elements. Yet, this location has certain disadvantages in terms of ease of fabrication. For example, in some embodiments the diffuser is made of organic materials with a thickness of many microns (e.g., 1-20 microns) which can be difficult to fabricate with interferometric modulator display elements made up of inorganic materials with sub-micron thicknesses.

In order to avoid the difficulties associated with placement of a diffuser either in front of, or behind, a light guide in a reflective display, in certain embodiments, a diffuser is integrated within the light guide. In some embodiments comprising a light guide with an integrated diffuser, the optical properties of the diffuser can be more easily matched to the other portions of the light guide to reduce Fresnel reflections and reduce some loss in viewing contrast. For example, embedding the diffuser within the light guide allows for the refractive index variation at the interface of the diffuser with the other portions of the light guide to be reduced. In addition, the diffuser is closer to the display or modulator elements, e.g., interferometric modulators, thereby increasing resolution when compared to a diffuser spaced farther from the display elements. In addition, such an integrated diffuser can be easily fabricated.

Figure 8:
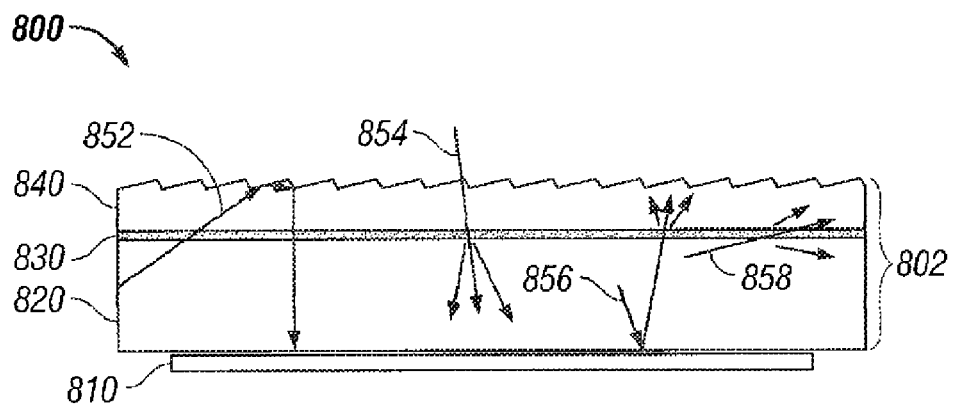
FIG. 8 is a cross section of a light guide for use in a reflective display.

FIG. 8 is a cross section of a light guide 802 for use in a reflective display 800. In the embodiment illustrated in FIG. 8, the light guide 802 includes an integrated diffuser 830. The light guide 802 also includes an optically transmissive substrate 820 slab, sheet, or plate that is disposed in front of an array of reflective display elements 810 (e.g., interferometric modulators). The light guide 802 also includes a turning layer 840 to direct light propagating within the light guide 802 toward the reflective display elements 810.

The integrated diffuser 830, in this case a diffusive layer, is formed between the optically transmissive substrate 820 and the turning layer 840. The diffuser 830 scatters light incident upon it in a range of directions to enlarge the viewing cone of the reflective display 800 and to give a more desirable paper-like appearance. The integrated diffuser 830 is embedded within the light guide 802. In some embodiments, the integrated diffuser 830 is formed between a substrate 820 and a turning layer 840, and in some cases adjacent the substrate 820 and/or turning layer 840, though this is not required. In some embodiments, the substrate 820, the turning layer 840, and the diffuser 830 form a monolithic light guide 802. It should be understood that in some embodiments, the turning layer 840, the diffusive layer 830 and the substrate 820 include one or more sub-layers. In addition, the light guide 802 may also include additional layers that serve, for example, mechanical functions such as adding strength to the light guide 802, or optical functions such as controlling how light is guided through the light guide 802.

The degree of haze of the diffuser 830 can be quantified by a haze value. One way of quantifying a haze value is to measure the extent to which a collimated beam of light that is incident upon the diffuser 830 is scattered outside a ±2.5° cone centered on the beam. (See also, e.g., ASTM D1003 "Standard Test Method for Haze and Luminous Transmittance of Transparent Plastics"). Diffusers that have a greater level of diffuseness have a correspondingly higher haze value. Although the haze value of the diffuser 830 varies from embodiment to embodiment, typically a haze value in the range from approximately 10% to approximately 90%, or more particularly from approximately 40% to 80%, is satisfactory. For example, a diffuser 830 with a haze value of approximately 50% is used in some embodiments.

The light guide 802 is formed of optically transmissive materials. For example, the substrate 820 can be formed of various types of glass or plastic chosen for their physical and optical characteristics such as their refractive indexes and durability. The turning layer 840 may be made of an optically transmissive material such as polycarbonate, acrylics, acrylate polymers and copolymers, and other materials, including but not limited to polymethymethacrylate (PMMA), poly (styrene-methylmethacrylate) polymers (PS-PMMA, sold under the name of Zylar), zenor, COC, and optically transmissive plastics.

In some embodiments, the diffuser 830 is a thin, solid film that contains microscopic scattering elements that scatter incident light. These microscopic scattering elements may have dimensions that are, for example, on the order of the wavelengths of visible light propagating within the light guide 802. Scattering features can, however, also be many times larger (e.g., 10-100 times larger) than the wavelength of light propagating through the diffuser 830. For example, the actual physical dimensions of scattering features can range from approximately 0.1-10 μm. The diffuser 830 may also be a fluidic adhesive that, for example, bonds the turning layer 840 to the substrate 820 and that also contains scattering elements such as microscopic scattering spheres. Thus, such a diffuser 830 would perform both the optical function of enlarging the viewing cone of light outputted by the light guide 802 as well as the mechanical function of bonding two or more other layers of the light guide 802 together.

In some embodiments, the refractive indexes of the multiple optical layers of the lightguide 802, including the substrate 820, the diffuser 830, and the turning layer 840, are advantageously similar such that light may be transmitted through the multiple optical layers without being substantially reflected or refracted. Matching the refractive indexes of the various layers of the light guide 802 improves optical efficiency of the device, as well as brightness and viewing contrast of the reflective display 800. In some embodiments, the refractive indexes of the optical layers of the light guide 802, including the substrate 820, the diffuser 830, and the turning layer 840, are in the range of about 1.40 to 1.65. In some embodiments, the substrate 820 is glass with a refractive index of 1.518 (at 580 nm), while adjacent layers have refractive indexes most preferably equal to or slightly greater than that of the substrate.

The reflective display 800, including the light guide 802, may be formed using any of a variety of manufacturing processes known to those skilled in the art. In some embodiments, the substrate acts as a support layer upon which an array of interferometric modulator display elements 810 is formed. In some embodiments, the diffusive layer 830 is formed on the opposite side of the substrate 820 from the array of interferometric modulator display elements 810. The diffuser 830 may, for example, be coated over, deposited on, laminated to, spun on, applied to, or adhered to the substrate 820. In some embodiments, the diffusive layer 830 includes scattering features etched into the substrate 820. In still other embodiments, the diffuser 830 is a thin film that is grown on the surface of the substrate 820.

In some embodiments, the turning layer 840 is disposed over the diffuser 830. For example, the turning layer 840 may be deposited on or laminated to the diffusive layer 830. As described herein, in some embodiments the diffusive layer is an adhesive containing scattering elements, in which case the turning layer 840 can be adhered to the substrate 820 by the diffusive layer 830.

Some embodiments of the light guide 802 do not exceed approximately 500 microns in thickness. More specifically, some embodiments of the light guide do not exceed approximately 200 microns in thickness. The thickness of the light guide 802 may be outside these ranges as well.

In some embodiments of the light guide 802, films, layers, components, and/or elements may be added, removed, or rearranged. Additionally, processing steps may be added, removed, or reordered. Also, each layer or film may include multiple sub-layers. Thus, any one of several arrangements of the several layers of the light guide 802 can be selected depending upon the particular application.

The operation of the light guide 802 is illustrated by light rays 852, 854, 856, and 858. Light ray 852 is a ray propagating internally within the light guide 802, which is formed from materials whose refractive indexes are greater than the surrounding medium (e.g., air). Light ray 852, originating, for example, from a built-in light source (not shown), is incident upon the turning layer 840 from within the light guide 802. Since the refractive index of the light guide 802 is greater than the surrounding air, light incident on the turning layer-air interface at an angle greater than the critical angle is reflected back into the light guide 802.

The turning layer 840 has a plurality of turning features for redirecting light incident upon the turning layer-air interface towards the array of display elements 810. For example, in the embodiment illustrated in FIG. 8, each turning feature is a micro-prism with a long, shallow facet and a short, steep facet. If light strikes the long, shallow facet and then the short, steep facet sequentially, total internal reflection occurs at both facet-air interfaces and the light is turned through a large angle (e.g., between about 70°-90°).

The turning layer 840 can be designed (e.g., by adjusting the relative angles of the facets) such that light incident upon the turning features from within the light guide 802 between a predefined range of angles is re-directed toward the array of display elements 810. In some embodiments, the turning layer 840 is designed to direct light toward the display elements 810 at or near normal incidence. After being turned through a large angle by the turning layer 840, light ray 852 is then transmitted through the thickness of the light guide 802 toward the array of display elements 810 where it may be reflected back through the light guide 802, this time at an angle less than the critical angle of the turning layer-air interface such that the ray exits the light guide 802, towards a viewer disposed in front of the reflective display 800. While a turning layer made up of micro-prisms is illustrated in FIG. 8, in other embodiments the turning layer 840 may be a holographic or diffractive turning film. Other types of turning films will also be apparent to those skilled in the art.

Light ray 854 is incident upon the light guide 802 from an external light source. The ray is transmitted through the turning layer 840 to the diffuser 830. At the diffuser, light ray 854 is scattered in several different directions. Some of the scattered light rays are incident upon the array of display elements 810 at angles where they can be reflected back through the thickness of the light guide and transmitted towards a viewer. Others of the scattered light rays may propagate at angles within the light guide 802, either before or after reflecting from the array of display elements 810, such that they exit the light guide 802 prematurely, for example, without contributing to the useful formation of an image.

Light ray 856 is incident upon the array of display elements 810, whether after having been re-directed by the turning layer 840 such as light ray 852, or after having entered the light guide 802 from an external light source such as light ray 854. Light ray 856 is reflected by the array of reflective display elements 810 (e.g., interferometric modulators) and is then incident upon the diffuser 830. Once again, the diffuser 830 scatters the light ray 856 in several different directions. Some of the scattered light rays are incident upon the turning layer-air interface at an angle less than the critical angle such that they exit the light guide 802. The scattered light rays exit the light guide 802 over a relatively large range of angles, forming an enlarged viewing cone, e.g., between about −45 and +45 degrees. Others of the light rays scattered by the diffuser 830 are re-directed back into the light guide 802.

Light ray 858 is a ray propagating within the light guide 802 in a direction generally along the width of the light guide (e.g., from one side of the reflective display 800 towards another). Light ray 858 may have originated from, for example, a built-in light source (not shown). As illustrated, light ray 858 is incident upon the diffuser 830 and scattered in several different directions. Some of these scattered rays propagate in directions such that they can be utilized and turned toward the array of display elements 810 and eventually transmitted toward a viewer. However, some of the scattered light rays may exit the light guide 802 prematurely before having been reflected by the array of display elements 810. As such, some light propagating through the light guide 802 is lost when it could more advantageously have been internally reflected to provide more light to display elements located at more distal positions of the light guide 802. This type of loss of light from the light guide 802 is generally undesirable as it reduces the brightness and/or viewing contrast of the reflective display 800. The consequences of this light loss due to scattering by the integrated diffuser 830 are illustrated in more detail in FIG. 9.

Figure 9:
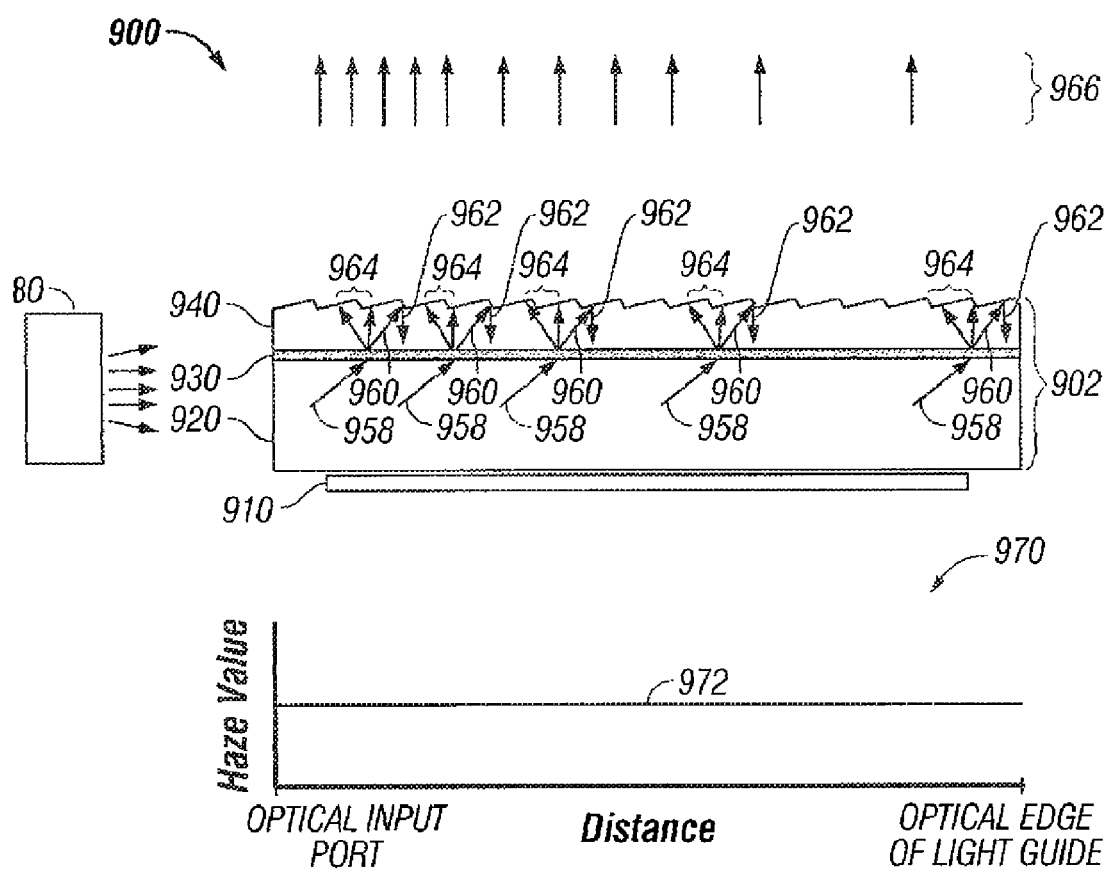
FIG. 9 illustrates the operation of a light guide having an integrated diffuser whose haze is spatially constant.

FIG. 9 illustrates the operation of a light guide 902 having an integrated diffuser 930 whose haze is spatially constant across the width of the light guide 902. The reflective display 900 includes a built-in light source 980 as well as a light guide 902 and an array of display elements 910 (e.g., an array of interferometric modulators). The light guide 902 includes a substrate 920, a diffuser 930, and a turning layer 940. The light guide 902 also has an input port optically coupled to the built-in light source 980. In the illustrated embodiment, the input port is the left-hand edge of the light guide 902. The operation of the light guide 902 is similar to the light guide 802 of FIG. 8. The built-in light source 980 can be, for example, a linear-type light source that extends along a side (e.g., into the page) of the light guide 902. The light source 980 injects light into an input port of the light guide 902. For example, the input port of the light guide 902 can be the edge of the light guide 902 along which the light source 980 extends. The light source 980 and input port of the light guide 902 can also be configured in many other arrangements that will be apparent to those of ordinary skill in the art.

After having been inputted by the light source 980, several light rays 958 propagate within the light guide 902. Similarly to light ray 858 of FIG. 8, when light rays 958 are incident upon the integrated diffuser 930, they are scattered in a number of different directions. The haze profile of the diffuser 930 is illustrated by plot 970. Plot 970 illustrates the haze value of the diffuser 930 as a function of position along the width of the light guide 902. As illustrated by line 972, the haze value of the diffuser 930 is constant across the width of the light guide 902 at macroscopic distance scales (it being understood that the uniform haze value over macroscopic distances may in fact result from light scattering processes whose amount and direction of scattering may vary significantly when considered at microscopic scales).

A portion of the scattered light rays that result when light rays 958 are incident upon the diffuser 930, for example, those labeled with reference number 960, are incident upon the turning layer-air interface at an angle greater than the critical angle and are re-directed toward the array of display elements 910 as light rays 962. However, a portion of the scattered light rays, for example, those labeled with reference number 964, are incident upon the turning layer-air interface at an angle less than the critical angle and exit the light guide 902. Thus, light rays 964 may exit the light guide 902 prematurely when taken in comparison to a light guide configuration without the integrated diffuser 930. For example, light rays 964 may exit the light guide 902 without having reflected off of the array of display elements 910 and without necessarily contributing to the formation of a viewable image. This effect may reduce the viewing contrast of the reflective display 900.

In addition, the premature loss of some light that is scattered by the diffuser 930 can reduce the propagation of light from the built-in light source 980 toward the distal end of the light guide 902. The result is progressively lesser amounts of light flux in the light guide 902 as the distance from the input port of the light guide 902 increases. This lessening of light flux within the light guide with increasing distance from the input port is illustrated schematically in FIG. 9 by the decreasing density of light rays 958 towards the side of the light guide 902 opposite the light source 980. The decreased amount of light flux within the light guide 902 at extremities away from the input port also results in a corresponding decrease in light outputted from the reflective display 900 in these areas. This decreasing amount of light outputted by the light guide 902 with increasing distance from the input port of the light source 980 is illustrated by the decreasing density of output rays 966 with increasing distance from the light source 980. This effect results in the portion of the reflective display 900 nearer the input port of the light guide 902 appearing brighter than portions of the display 900 that are further away from the input port of the light guide 902. It is generally preferable for the display 900 to have a uniform brightness and contrast across its spatial extents rather than to have this type of spatial hot spot in any particular region of the display 900.

Figure 10:
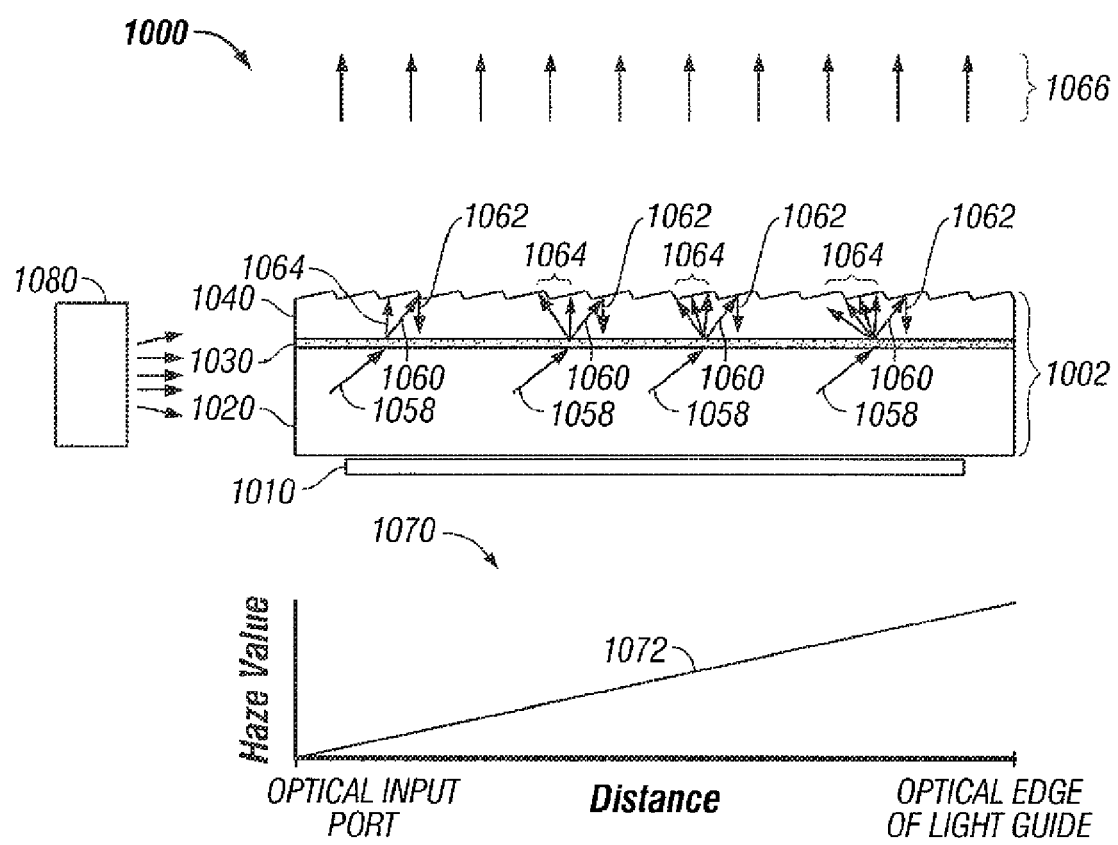
FIG. 10 illustrates the operation of a light guide having an integrated diffuser whose haze varies across at least a portion of the light guide.

In contrast with FIG. 9, FIG. 10 illustrates the operation of a light guide 1002 having an integrated diffuser 1030 whose haze varies macroscopically across at least a portion of the light guide 1002 (e.g., across the light guide's width and/or height). The reflective display 1000 includes a built-in light source 1080 as well as a light guide 1002 and an array of display elements 1010 (e.g., an array of interferometric modulators). The light guide 1002 includes a substrate 1020, a diffuser 1030, and a turning layer 1040. The light guide 1002 also has an input port optically coupled to the built-in light source 1080. In the illustrated embodiment, the input port is the left-hand edge of the light guide 1002. The operation of the light guide 1002 is similar to the light guide 902 of FIG. 9 in some respects. However, the haze of the diffuser 1030 is non-uniform. This is illustrated in plot 1070 where the haze value of the diffuser 1030 is plotted as a function of distance on the display 900 from the input port of the light source 1080. In this case, line 1072 represents a linear relationship between haze value of the diffuser 1030 and distance from the input port. The diffuser 1030 can also be designed so that its haze varies non-linearly. In some embodiments, the haze of the diffuser 1030, for example as measured by its haze value, increases monotonically with distance from the input port of the light guide 1002, though this is not required. In addition, the haze of the diffuser 1030 may be gradated such that it varies smoothly. The haze of the diffuser may also vary in a step-wise fashion. In some embodiments, the haze of the diffuser 1030 increases over at least 90% of the display 1000. In some embodiments, the haze of the diffuser 1030 increases over at least 75% of the display 1000. In some embodiments the haze of the diffuser 1030 increases over at least 50% of the display 1000. In some embodiments, one half of the diffuser 1030 (e.g., the half more distant from the light source input port) has a haze that is, on average, greater than the other half For example, the half of the diffuser 1030 most distant from the light source input port may, on average, have a haze value at least twice the average haze value of the half nearest the light source input port.

The haze of the diffuser 1030 can be varied, for example, by spatially varying the thickness of the diffuser or by spatially varying the density of scattering features within the diffuser. Other methods of varying the haze are also possible. In some embodiments, the haze of the diffuser is measured over a dimension at least as large as the thickness of the diffuser. In other embodiments, the haze of the diffuser is measured over an area of at least about 5×5 mm$^2$ or over an area the size of a beam of light used to measure haze values according to accepted standards.

As noted herein, in some embodiments the haze of the diffuser (e.g., 1030) increases with increasing distance from an input port of a light guide. For example, in some embodiments, if the display or the portion of the diffuser overlapping display elements (e.g., pixels) were divided up into a number of segments (e.g., equal segments) located different distances from an input port of a light guide, then a measurement of the average haze of the diffuser or the display at any given section would be greater than a measurement of the average haze of a neighboring section located closer to the light guide input port. In some embodiments, if the display or the portion of the diffuser overlapping display elements were divided into ten equal sections located at different distances from an input port of a light guide, then the average haze of the section nearest the input port would give the lowest haze value, while measurements of the average haze at each of the remaining nine sections would result in haze values larger than the immediately neighboring section closer to the input port (e.g., the average haze of the second section being greater than the average haze of the first, the average haze of the third section being greater than the average haze of the second section . . . the average haze of the tenth section being greater than the average haze of the ninth section). In other embodiments, the same would be true of a diffuser or display divided into, for example, two, three, four, or eight equal sections rather than ten.

Referring to the cross-section of the light guide 1002 illustrated in FIG. 10, the built-in light source 1080 of the reflective display 1000 injects light at the input port of the light guide 1002. Light rays 1058 propagate within the light guide 1002 and are incident upon the integrated diffuser 1030. The diffuser 1030 scatters the light rays 1058 into several different directions. The increasing haze of the diffuser 1030 with distance from the light input port of the light guide 1002 is schematically represented in FIG. 10 by the increasing number of scattered rays 1064 with distance from the input port. Similarly to what is illustrated in FIG. 9, a portion of the scattered light rays that result when light rays 1058 are incident upon the diffuser 1030, for example, those labeled with reference number 1060, are incident upon the turning layer-air interface at an angle greater than the critical angle and are re-directed toward the array of display elements 1010 as light rays 1062. However, a portion of the scattered light rays, for example, those labeled with reference number 1064, are incident upon the turning layer-air interface at an angle less than the critical angle and exit the light guide 1002. As discussed herein, these light rays 1064 may exit the light guide 1002 prematurely without having first reflected from the array of display elements 1010 and/or before having traveled the intended distance within the light guide 1002.

However, notwithstanding the light rays 1064 that may exit the light guide 1002 prematurely, the light flux in the light guide 1052 changes relatively less than illustrated in FIG. 9 as a result of the spatially non-uniform haze of the diffuser 1030. In fact, in some embodiments, the light flux within the light guide 1002 remains relatively constant as the distance from the light source 1080 increases. This relatively constant light flux within the light guide 1002 with increasing distance from the light source 1080 is illustrated schematically in FIG. 10 by the relatively constant density of light rays 1058 towards the side of the light guide 1002 opposite the light source 1080. The relatively constant amount of light flux within the light guide 1002 at extremities away from the optical input port also results in a corresponding relative uniformity in light outputted from the reflective display 1000 in these areas. This relatively uniform spatial emittance distribution is illustrated by the uniform density of output rays 1066 with increasing distance from the optical input port 1002. Thus, the spatial hotspots in the brightness of the reflective display 900 in FIG. 9 are reduced in the embodiment of FIG. 10, making for more uniform brightness and contrast across the face of the display 1000.

Although the turning features shown in FIG. 10 have a substantially constant periodicity, in other embodiments, the periodicity and/or other characteristic, e.g., shape, size, etc., of the turning features may vary. In certain embodiments, for example, the turning features vary across the turning layer 1040 so as to increase turning efficiency from one end of the light guide 1002 to another. Such a design may also address the fact that the intensity of light within the light guide 1002 may be higher closer to the light source 1080 than further from the light source where much of the light has already been turned out of the light guide. Uniformity in brightness across the display can be increased with such variation in the turning features. Having a diffuser that additionally varies with distance from the light source 1080 may further enhance uniformity in brightness.

There are several ways of creating a diffuser 1030 with spatially non-uniform haze. For example, in some embodiments, the diffuser 1030 is made up of microscopic scattering features. The haze of the diffuser 1030 can be made to spatially vary by altering the spacing, size, or shape of the scattering features at different locations in the light guide 1102, as is understood by those skilled in the art. In some embodiments, the diffuser 1030 is a diffractive or holographic diffuser. The haze of the holographic diffuser can likewise be made to spatially vary, for example by recording the variation therein.

Figure 11:
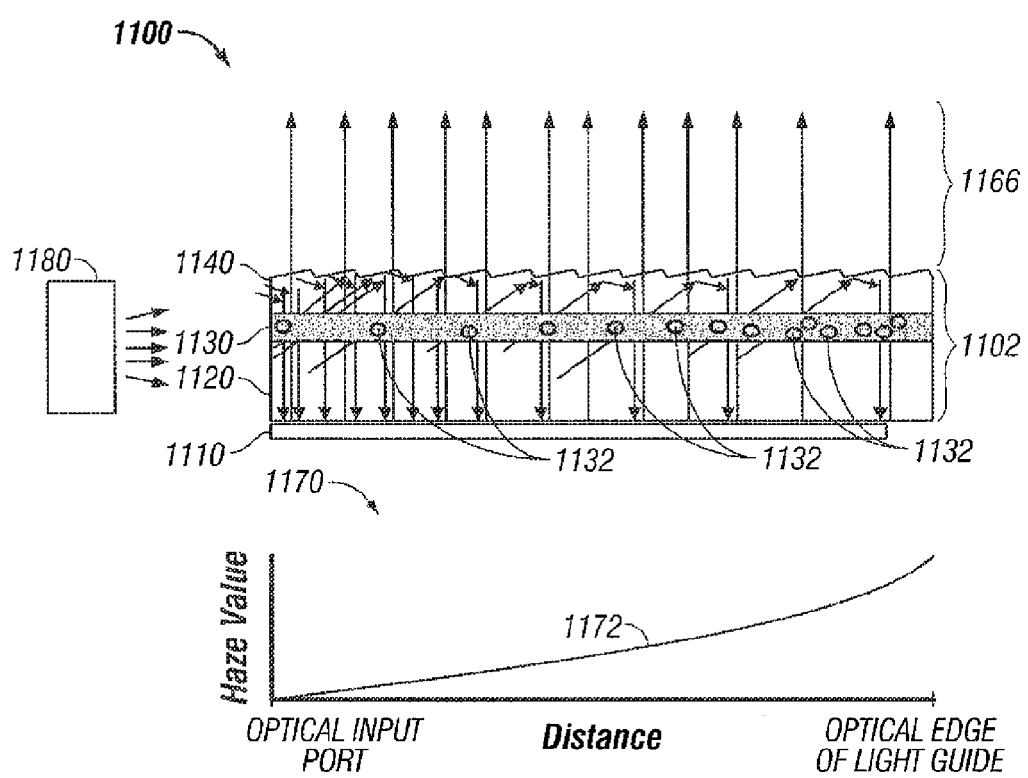
FIG. 11 illustrates the operation of a light guide having an integrated diffuser comprising a plurality of scattering elements and whose haze varies across at least a portion of the light guide.

FIG. 11 illustrates yet another way of creating a diffuser with spatially non-uniform haze. The reflective display 1100 includes a built-in light source 1180 as well as a light guide 1102 and an array of display elements 1110 (e.g., an array of interferometric modulators). The light guide 1102 includes a substrate 1120, a diffuser 1130, and a turning layer 1140. The light guide 1102 also has an input port optically coupled to the built-in light source 1180. In the illustrated embodiment, the input port is the left-hand edge of the light guide 1102. The operation of the light guide 1102 is similar to the light guide 1002 of FIG. 10. The haze of the diffuser 1130 is non-uniform. This is illustrated in plot 1170 where the haze value of the diffuser 1130 is plotted as a function of distance across the width of the display 1100 from the input port of the light source 1180. In this case, line 1172 represents a non-linear, monotonically increasing relationship between haze value of the diffuser 1130 and distance from the input port. However, it should be understood that the diffuser 1130 can also be designed so that its haze varies spatially in other ways.

The diffuser 1130 includes individual scattering particles 1132 suspended within a solid or liquid film. As illustrated, the localized density of the scattering particles 1132 increases with increasing distance from the input port of the light guide 1102. The increasing density of the scattering particles corresponds to a greater level of diffuseness and increased haze value. The consequence of the non-uniform haze of the diffuser 1130 is a relatively uniform spatial emittance distribution, as illustrated by the uniform density of output rays 1166 with increasing distance from the optical input port of the light guide 1102.

While the presence of a diffuser (e.g., 930) within a light guide (e.g., 902) of a reflective display (e.g., 900) can have the desirable effect of enlarging the viewing cone of the display, the presence of the diffuser can also introduce certain complications. For example, as described herein, the diffuser may scatter light out of the light guide prematurely and may also reduce the propagation of light within the light guide downstream from the optical input port of a built-in light source (e.g., 980). While FIGS. 10 and 11 illustrate embodiments that address these complications with spatially non-uniform diffusers, these effects can also be addressed by causing the haze of the diffuser to be temporally non-uniform. For example, the diffuser can be made switchable between two or more levels of haze. The diffuser may be switched to a relatively high level of haze when the display's built-in light source is off and the display is operating with an external source of light. In this state, the relatively high level of haze reduces the specular behavior of the reflective display and enlarges the viewing cone. When the display is operating with its built-in light source turned on, for example in dark ambient conditions, the diffuser may be switched to have a relatively low level of haze. The reduced haze of the diffuser lessens the types of losses sometimes associated with the integrated diffuser, as described herein.

Figure 12:
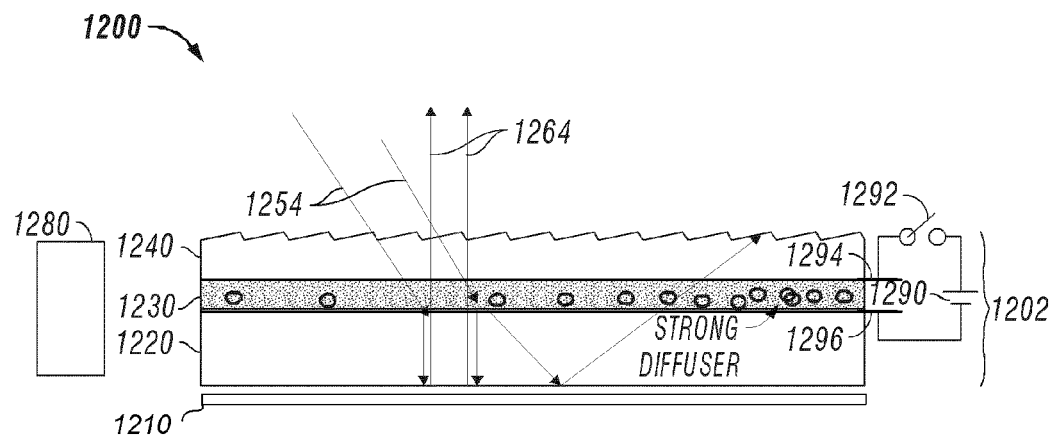
FIG. 12 illustrates a light guide having an integrated diffuser whose haze varies across at least a portion of the light guide and is electrically controllable.
Figure 13:
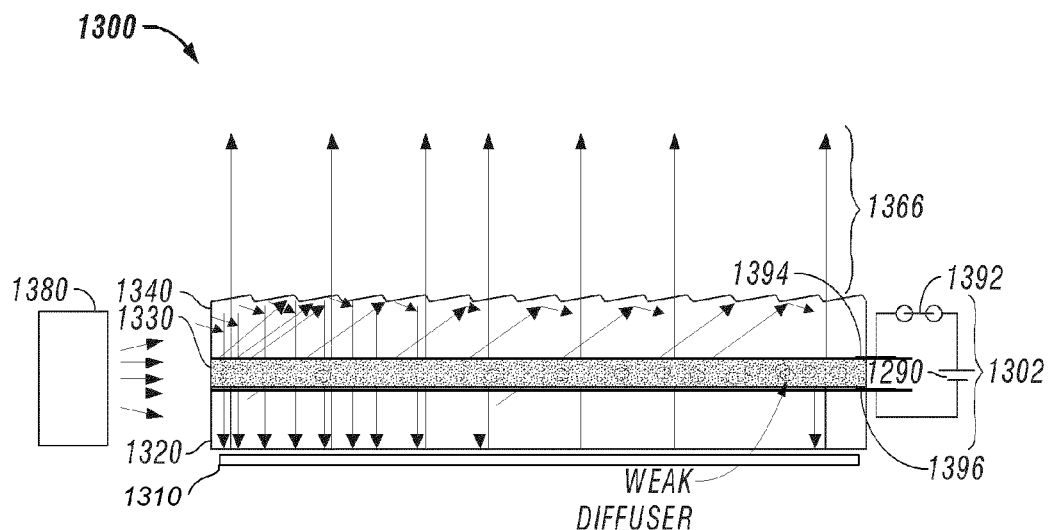
FIG. 13 illustrates a light guide having an integrated diffuser whose haze varies across at least a portion of the light guide and is electrically controllable.

FIGS. 12 and 13 illustrate light guides with diffusers that have controllable levels of haze. The reflective display 1200 includes a built-in light source 1280 as well as a light guide 1202 and an array of display elements 1210 (e.g., an array of interferometric modulators). The light guide 1202 includes a substrate 1220, a switchable diffuser 1230, and a turning layer 1240. The switchable diffuser 1230 can be controlled to have two or more different levels of haze. These may be discrete levels or a continuous range of haze between a maximum level with a maximum haze value and a minimum level with a minimum haze value. In one embodiment, the switchable diffuser 1230 is a polymer-dispersed liquid crystal (PDLC) film. The haze of a PDLC film changes depending upon the amount of electric voltage applied across it, as is known in the art. The light guide 1202 also has an input port optically coupled to the built-in light source 1280. In the illustrated embodiment, the input port is the left-hand edge of the light guide 1202. The operation of the light guide 1202 is similar to that of other embodiments described herein.

In the illustrated embodiment, the switchable diffuser 1230 is electrically controllable. As such, the light guide 1202 includes electrodes 1294 and 1296. The electrodes 1294 and 1296 may be, for example, layers of an optically transmissive material such as transparent conducting oxide (TCO) like indium tin oxide (ITO) formed on opposing sides of the switchable diffuser 1230. ZnO can also be used as a transparent conductor. The electrodes 1294 and 1296 are electrically connected to a source of electrical power 1290. The haze state of the switchable diffuser 1230 is controlled by a switch 1292 that is used to apply differing voltages to the switchable diffuser 1230. Other methods and configurations for electrically switching the diffuser 1230 will be apparent to those skilled in the art.

The light guide 1202 in FIG. 12 is operating under relatively bright ambient lighting conditions such that an external source provides the light for the image formed by the reflective display 1200. The external light source is illustrated by light rays 1254 that are incident upon the face of the light guide 1202 from the exterior of the display 1200. Under external lighting conditions, the switch 1292 is positioned such that the switchable diffuser 1230 is controlled to have a relatively high level of haze. For example, in some embodiments, the reflective display 1200 includes a controller (not shown) configured to set the haze of the switchable diffuser 1230 at a maximum value when the display's built-in light source 1280 is off and the display is operating using an external light source. This relatively high level of haze scatters light reflected by the display 1200 over a larger range of angles, enhancing the viewing experience for a user.

The light guide 1302 illustrated in FIG. 13 is identical to the light guide 1202 in FIG. 12. However, in the light guide 1302 of FIG. 13, the display's built-in light source 1380 is on and the switch 1392 is positioned such that the switchable diffuser 1330 has a relatively low level of haze. The decreased haze of the diffuser 1330 reduces the amount of light scattered out of the light guide 1302 prematurely and increases the amount of light that propagates to the distal side of the light guide 1302 from the optical input port of the built-in light source 1380. Importantly, under dark ambient lighting conditions, the specular nature of the reflective display 1300 is less problematic than the case where the display is operating with ambient light because the turning features of the turning layer can be designed to turn light from the artificial light source to ensure proper light distribution within the viewing cone for the viewer. The shape of the turning features, for example, may provide such control over the viewing cone. Thus, the switchable diffuser 1330 can be less diffuse when the light guide 1302 is operating with the built-in light source 1380 without unduly sacrificing optical performance of the display 1300.

In some embodiments, when the built-in light source 1380 is switched on, the switchable diffuser 1330 is controlled to have its minimum level of haze. For example, in some embodiments, the haze of the diffuser 1330 at a given spatial location is at least about 30% less than the haze of the diffuser 1330 at the same location while in the maximum haze state. In some embodiments, the haze of the diffuser 1330 at a given spatial location is at least about 80% less than the haze of the diffuser 1330 at the same location while in the maximum haze state. As illustrated in FIGS. 12 and 13, the haze of the switchable diffuser 1230, 1330, besides being controllable, is also spatially non-uniform, though this is not required. For example, in some embodiments, the haze of the switchable diffuser 1230, 1330 is spatially uniform. In particular, if the level of haze can be controlled to become very low, the spatial distribution of the haze may become less important to the point that a uniform spatial haze distribution may be considered in some applications. For example, if the level of haze can be controlled to become effectively zero, then it may be beneficial for the haze to be spatially constant. In practice, however, it may be difficult to control the haze to be come effectively zero, in which case a non-uniform spatial distribution of haze may be particularly useful.

Although only certain preferred embodiments and examples have been explicitly disclosed, other embodiments will be apparent to those skilled in the art. It is also contemplated that some embodiments include various combinations or sub-combinations of the specific features and aspects of the explicitly disclosed embodiments. It should be understood that various features and aspects of the disclosed embodiments can be combined with, or substituted for, one another in order to form additional embodiments. Thus, it is intended that the scope of the claims should not be limited by the particular disclosed embodiments described above.

What is claimed is:

1. A display device comprising:
   an optically transmissive substrate;
   a plurality of display elements rearward of the substrate;
   a plurality of turning features forward of the substrate;
   a diffuser between the plurality of turning features and the substrate, wherein the haze of the diffuser is spatially non-uniform; and
   at least one input port for coupling light from a light source into the display device,
   wherein the trend of the haze of the diffuser increases with distance from the input port.

2. The display device of claim 1, wherein the turning features are configured to direct light that is incident upon the turning features from within the substrate toward the plurality of display elements.

3. The display device of claim 1, wherein the diffuser has a first haze value at a first location near the input port and a second haze value at a second location, the second location being situated further from the input port than the first location, wherein the haze value at the second location is greater than the haze value at the first location, wherein the haze value at the second location is at least 10% greater than the haze value at the first location.

4. The display device of claim 3, wherein the second location is at least 90% of the maximum distance away from the input port.

5. The display device of claim 1, wherein the input port comprises a first side edge of the substrate and the haze of the diffuser increases smoothly toward a second side edge opposite the first side edge.

6. The display device of claim 5, wherein the haze of the diffuser increases substantially linearly from the first side edge to the second side edge.

7. The display device of claim 1, wherein the diffuser has a thickness that does not exceed approximately 500 microns.

8. The display device of claim 7, wherein the diffuser has a thickness that does not exceed approximately 200 microns.

9. The display device of claim 1, wherein the diffuser comprises a plurality of optical scattering elements.

10. The display device of claim 9, wherein the local density of the scattering elements increases with distance from the input port.

11. The display device of claim 1, wherein the substrate comprises glass or plastic.

12. The display device of claim 1, wherein the plurality of display elements comprise interferometric modulators.

13. The display device of claim 1, wherein the diffuser comprises a diffusive layer formed on a front surface of the substrate and the plurality of turning features comprise a prismatic film formed on the diffusive layer.

14. The display device of claim 1, wherein the diffuser is switchable between a first state wherein the diffuser has a first haze value at a selected point and a second state wherein the diffuser has a second haze value at the selected point.

15. The display device of claim 14, wherein the display device comprises a pair of electrodes configured to apply a voltage across the diffuser and the diffuser is electrically switchable between the first and second states.

16. The display device of claim 15, wherein the diffuser comprises polymer-dispersed liquid crystal (PDLC).

17. The display device of claim 16, further comprising a controller that outputs an electrical control signal to place the diffuser in the first state if a light source optically coupled to the input port is on, and to place the diffuser in the second state if the light source is off, wherein the haze value of the diffuser at the selected point while in the first state is less than the haze value of the diffuser at the selected point while in the second state.

18. The display device of claim 17, wherein the haze value of the diffuser at the selected point while in the first state is at least approximately 30% less than the haze value of the diffuser at the selected point while in the second state.

19. The display device of claim 1, wherein the haze of the diffuser is gradated.

20. The display device of claim 1, further comprising:
a processor that is configured to process image data; and
a memory device that is configured to communicate with the processor.

21. The display device of claim 20, further comprising a driver circuit configured to send at least one signal to the display elements.

22. The display device of claim 21, further comprising a controller configured to send at least a portion of the image data to the driver circuit.

23. The display device of claim 20, further comprising an image source module configured to send said image data to the processor.

24. The display device of claim 23, wherein said image source module comprises at least one of a receiver, transceiver, and transmitter.

25. The display device of claim 20, further comprising an input device configured to receive input data and to communicate the input data to the processor.

26. A display device comprising:
a plurality of pixels;
a light assembly configured to illuminate the plurality of pixels, the light assembly comprising:
a light source to output light;
a light guide that is configured to distribute light from the light source to the plurality of pixels; and
a diffuser that is switchable between a first state wherein the diffuser has a first haze value at a selected point and a second state wherein the diffuser has a second haze value at the selected point, the second haze value being greater than the first; and
a controller configured to receive a control input indicative of the output of the light source, the controller being further configured to place the diffuser in the first state when the output of the light source is above a selected threshold, and to place the diffuser in the second state when the output of the light source is below the selected threshold.

27. The display device of claim 26, wherein the haze of the diffuser is spatially non-uniform while in the first state.

28. The display device of claim 26, wherein the haze of the diffuser is spatially non-uniform while in the second state.

29. The display device of claim 28, wherein the haze value of the diffuser increases, on average, with increasing distance from the light source.

30. The display device of claim 28, wherein the haze value increases monotonically with distance from the light source.

31. The display device of claim 28, wherein the spatial non-uniformity of the haze value is gradated.

32. The display device of claim 26, wherein the haze value of the diffuser at the selected point while in the first state is at least approximately 30% less than the haze value of the diffuser at the selected point while in the second state.

33. The display device of claim 26, further comprising:
a processor that is configured to process image data; and
a memory device that is configured to communicate with the processor.

34. The display device of claim 33, further comprising a driver circuit configured to send at least one signal to the plurality of pixels.

35. The display device of claim 34, further comprising a second controller configured to send at least a portion of the image data to the driver circuit.

36. The display device of claim 33, further comprising an image source module configured to send said image data to the processor.

37. The display device of claim 36, wherein said image source module comprises at least one of a receiver, transceiver, and transmitter.

38. The display device of claim 33, further comprising an input device configured to receive input data and to communicate the input data to the processor.

39. A display device comprising:
means for providing structural support to the display device, said support means being optically transmissive;
means for displaying an image, said image display means disposed rearward of the support means;
means for turning light, said light turning means disposed forward of the support means;
means for diffusing light, said diffusing means disposed between the light turning means and the support means, wherein the haze of the diffusing means is spatially non-uniform; and
means for coupling light into the display device, the light coupling means including at least one input port for coupling light from a light source into the display device,
wherein the trend of the haze of the diffuser increases on average with distance from the input port.

40. The display device of claim 39, wherein the support means comprises a substrate, the image display means comprises a plurality of display elements, the light turning means comprises a plurality of turning features, or the diffusing means comprises a diffuser.

41. The display device of claim 40, wherein the turning features are configured to direct light that is incident upon the turning features from within the substrate toward the plurality of display elements.

42. The display device of claim 41, wherein the diffusing means has a first haze value at a first location near the light coupling means and a second haze value at a second location, the second location being situated further from the light coupling means than the first location, wherein the haze value at the second location is greater than the haze value at the first location, wherein the haze value at the second location is at least 10% greater than the haze value at the first location.

43. The display device of claim 42, wherein the second location is at least 90% of the maximum distance away from the input port.

44. The display device of claim 41, wherein the input port comprises a first side edge of the substrate and the haze of the diffuser increases smoothly toward a second side edge opposite the first side edge.

45. The display device of claim 40, wherein the plurality of display elements comprise interferometric modulators.

46. The display device of claim 40, wherein the diffuser comprises a diffusive layer formed on a front surface of the substrate and the plurality of turning features comprise a prismatic film formed on the diffusive layer.

47. The display device of claim 40, wherein the diffuser is switchable between a first state wherein the diffuser has a first haze value at a selected point and a second state wherein the diffuser has a second haze value at the selected point.

48. The display device of claim 47, wherein the display device comprises a pair of electrodes configured to apply a voltage across the diffuser and the diffuser is electrically switchable between the first and second states.

49. The display device of claim 48, further comprising a controller that outputs an electrical control signal to place the diffuser in the first state if a light source optically coupled to the input port is on, and to place the diffuser in the second state if the light source is off, wherein the haze value of the diffuser at the selected point while in the first state is less than the haze value of the diffuser at the selected point while in the second state.

50. The display device of claim 40, wherein the haze of the diffuser is gradated.

51. A display device comprising:
 means for displaying an image;
 means for illuminating the image display means, the illumination means comprising:
  means for outputting light;
  means for guiding and distributing light from the light outputting means to the image display means;
  means for diffusing light, wherein the light diffusing means is switchable between a first state wherein the light diffusing means has a first haze value at a selected point, and a second state wherein the light diffusing means has a second haze value at the selected point, the second haze value being greater than the first; and
 means for controlling, the control means being configured to receive a control input indicative of the output of the light outputting means, the control means being further configured to place the light diffusing means to be in the first state when the output of the light outputting means is above a selected threshold, and to place the light diffusing means in the second state when the output of the light outputting means is below the selected threshold.

52. The display device of claim 51, wherein the image display means comprises a plurality of pixels, the illuminating means comprises a light assembly, the light outputting means comprises a light source, the guiding and distributing means comprises a light guide, the light diffusing means comprises a diffuser, or the control means comprises an electronic controller.

53. The display device of claim 52, wherein the haze of the diffuser is, on average, spatially non-uniform while in the first state.

54. The display device of claim 53, wherein the haze value of the diffuser increases, on average, with increasing distance from the light source.

55. The display device of claim 53, wherein the spatial non-uniformity of the haze value is gradated.

56. The display device of claim 52, wherein the haze of the diffuser is, on average, spatially non-uniform while in the second state.

57. A method for fabricating a display device, the method comprising:
 providing an optically transmissive substrate;
 disposing a plurality of display elements below the substrate;
 disposing a diffuser above the substrate, wherein the haze of the diffuser is spatially non-uniform;
 disposing a plurality of turning features above the diffuser; and
 providing at least one input port for coupling light from a light source into the display device,
 wherein the trend of the haze of the diffuser increases with distance from the input port.

58. A method for operating a display device, the method comprising:
 providing a display device comprising,
  a plurality of pixels, and
  a light assembly configured to illuminate the plurality of pixels, the light assembly comprising a light source to output light, a light guide that is configured to distribute light from the light source to the plurality of pixels, and a diffuser that is switchable between a first state wherein the diffuser has a first haze value at a selected point and a second state wherein the diffuser has a second haze value at the selected point, the second haze value being greater than the first; and
 receiving a control input indicative of the output of the light source, and controlling the diffuser to be in the first state when the output of the light source is above a selected threshold, and controlling the diffuser to be in the second state when the output of the light source is below the selected threshold.

* * * * *